(12) United States Patent
Niizawa et al.

(10) Patent No.: US 8,539,517 B2
(45) Date of Patent: Sep. 17, 2013

(54) OPTICAL DISK APPARATUS

(75) Inventors: Hisaya Niizawa, Minato-ku (JP);
Masashi Kubota, Minato-ku (JP); Kenji Tagami, Minato-ku (JP)

(73) Assignee: NEC Corporation, Tokyo (JP)

( * ) Notice: Subject to any disclaimer, the term of this patent is extended or adjusted under 35 U.S.C. 154(b) by 62 days.

(21) Appl. No.: 13/384,985

(22) PCT Filed: Jul. 15, 2010

(86) PCT No.: PCT/JP2010/062393
§ 371 (c)(1),
(2), (4) Date: Jan. 19, 2012

(87) PCT Pub. No.: WO2011/010712
PCT Pub. Date: Jan. 27, 2011

(65) Prior Publication Data
US 2012/0192211 A1    Jul. 26, 2012

(30) Foreign Application Priority Data

Jul. 21, 2009    (JP) ................................ 2009-169951

(51) Int. Cl.
*G11B 23/03*    (2006.01)
(52) U.S. Cl.
USPC ........................................................ 720/614
(58) Field of Classification Search
USPC ........................................................ 720/614
See application file for complete search history.

(56) References Cited

U.S. PATENT DOCUMENTS

| 7,810,110 | B2 * | 10/2010 | Fujimoto | 720/614 |
| 8,352,974 | B2 * | 1/2013 | Inoue | 720/704 |
| 8,355,301 | B2 * | 1/2013 | Ebina et al. | 369/30.57 |
| 2008/0288969 | A1 * | 11/2008 | Waiman | 720/615 |

(Continued)

FOREIGN PATENT DOCUMENTS

| JP | 2006-216156 A | 8/2006 |
| JP | 2007-004906 A | 1/2007 |

(Continued)

OTHER PUBLICATIONS

International Search Report of PCT/JP2010/062393 dated Oct. 19, 2010.

*Primary Examiner* — Mark Blouin
(74) *Attorney, Agent, or Firm* — Sughrue Mion, PLLC

(57) ABSTRACT

[Problem] The problem is to provide a system with a large capacity as the recording and regenerating apparatus through piling optical disks and stocking the piled optical disks compactly.
[Means to solve the Problem] An optical disk recording and regenerating apparatus to make a holding means, which includes an optical disk sucking part to suck an upper surface of an optical disk, and a partition sheet sucking part to suck a partition sheet by sucking a held area of the partition sheet and which sucks and holds at least one of the optical disk and the partition sheet, move to an optical disk drive from a tray loaded with a plurality of the optical disks which are piled through the partition sheet having the held area projecting from an edge of the optical disk and not overlapping with the optical disk when the optical disk and the partition sheet are piled. It may be preferable that the partition sheet includes an optical disk exposing area, and the holding means includes an optical disk sucking part to suck the upper surface of the optical disk in the optical disk exposing area, and a partition sheet sucking part to suck an upper surface of the partition sheet.

15 Claims, 27 Drawing Sheets

(56) References Cited

U.S. PATENT DOCUMENTS

| | | | |
|---|---|---|---|
| 2009/0025021 A1* | 1/2009 | Iguchi et al. | 720/674 |
| 2010/0180287 A1* | 7/2010 | Makanawala | 720/617 |
| 2011/0283299 A1* | 11/2011 | Takano et al. | 720/603 |

FOREIGN PATENT DOCUMENTS

| | | |
|---|---|---|
| JP | 2007-012201 A | 1/2007 |
| JP | 2007-172728 A | 7/2007 |
| WO | WO 2009/066538 A1 | 5/2009 |

* cited by examiner

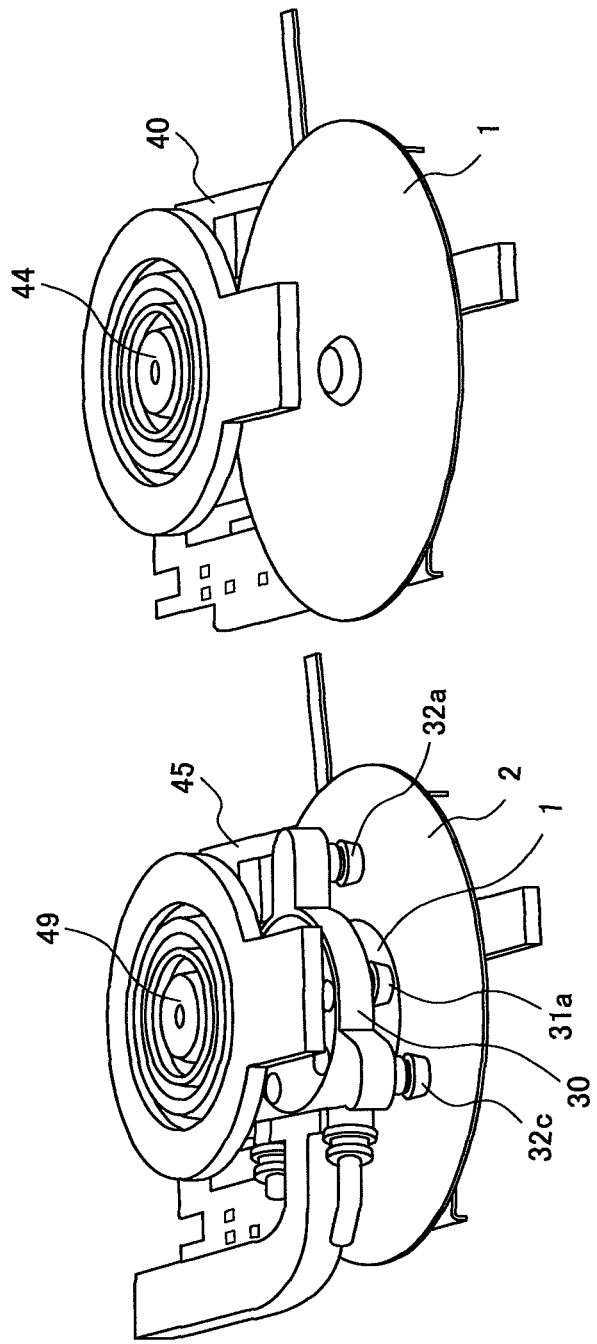

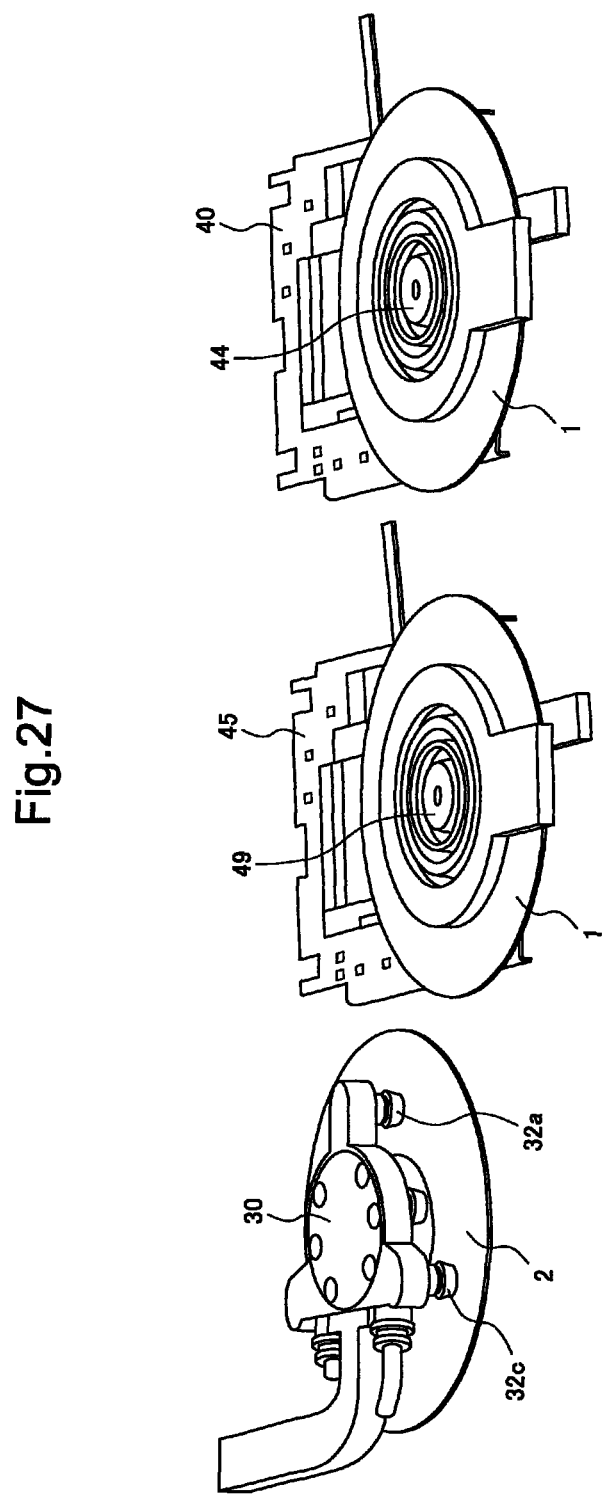

OPTICAL DISK APPARATUS

CROSS REFERENCE TO RELATED APPLICATIONS

This application is a National Stage of International Application No. PCT/JP2010/062393 filed Jul. 15, 2010, claiming priority based on Japanese Patent Application No. 2009-169951 filed Jul. 21, 2009, the contents of all of which are incorporated herein by reference in their entirety.

TECHNICAL FIELD

The present invention relates to an optical disk apparatus which takes out an optical disk from an optical disc case loaded with a plurality of the optical disks, and regenerates a record.

BACKGROUND ART

In recent years, a capacity of a storage medium, which stores information, becomes remarkably increasing as an amount of data which is processed by a computer becomes increasing. The storage medium such as a hard disk, a magnetic tape and a disk type storage medium like an optical disk are used in many cases. The hard disk out of the storage media is used as a main storage apparatus since the hard disk has an advantage of the high speed property and the random access property for storing and regenerating data.

In contrast, the magnetic tape and the disk type storage medium are used for archive and backup. The magnetic tape is excellent in a point of the low cost and the large storage capacity per unit volume in comparison with the disk type storage medium. However, the magnetic tape is inferior in a point of the random access property and the data holding property in comparison with the disk type storage medium.

For this reason, it is desired to realize a storage medium which has the excellent points of the disk type storage medium and of the magnetic tape and also has the excellent random access property and the excellent data holding property.

As a method to increase a capacity of the storage medium such as the optical disk, Japanese Patent Application Laid-Open No. 2007-4906 (hereinafter, referred to as patent document 1), Japanese Patent Application Laid-Open No. 2007-172728 (hereinafter, referred to as patent document 2) and Japanese Patent Application Laid-Open No. 2006-216156 (hereinafter, referred to as patent document 3) disclose the method to pile a plurality of the optical disks on the optical disk case and to stock a plurality of the optical disks, which are piled, in the optical disk case. The patent document 1 and the patent document 2 disclose the method that one optical disk is selected out of a plurality of the optical disks, which are stocked, to be taken out, and the optical disk, which is taken out, is transported to the data recording and regenerating drive. The invention described in the patent document 3 discloses the method to transport the optical disk, which is taken out in an order of piling, to the data recording and regenerating drive. The patent document 3 discloses also the case of using the spindle which enables the optical disks to be arranged leaving spaces between them and to pile the optical disks. According to the patent document 3, the optical disk has the hole, whose inner diameter is different for each optical disk, at its center. The axis of the spindle has the form of stair which is corresponding to each hole and is fitted with each the hole.

DISCLOSURE OF THE INVENTION

Problem to be Solved by the Invention

According to the inventions disclosed in the patent document 1 and the patent document 2, it is impossible to transport a plurality of the optical disks simultaneously. Therefore, in the case of transporting a plurality of the optical disks to the data recording and regenerating drive, it takes much time. Moreover, in the case that desired information is recorded in a plurality of the disks, it is necessary to exchange the disk each time when accessing the other disk. Accordingly, the method disclosed in the patent document 1 and the patent document 2 has a difficulty that the random access property is inferior. Similarly, the invention disclosed in the patent document 3 has a problem that the access property is inferior. In addition, according to the method disclosed in the patent document 3, it takes much time to transport the disk since the disk is taken out sequentially from the top. Moreover, since the axis of the spindle has the form of stair, it is necessary that the diameter of the hole of the optical disk has to be processed dedicatedly. That is, according to the method disclosed in the patent document 3, the optical disk to be used loses the general purpose property. Moreover, according to the method disclosed in the patent document 3, cost of the disk becomes increasing since it is necessary to prepare a plurality of disks which have different diameters respectively. Moreover, cost of the apparatus becomes increasing since the spindle has the complicated structure. Furthermore, the inventions disclosed in the patent document 1 to the patent document 3 have a problem that the disks sticks each other since a plurality of the optical disks are stocked with being piled directly each other.

Then, the present invention provides a system which can pile and stock the optical disks compactly without making the optical disk have specific structure, and which transports the optical disk having the excellent random access property to the data recording and regenerating drive at a high speed.

Means to Solve the Problem

In order to solve the above-mentioned problem, an optical disk apparatus according to the present invention includes:

a tray to be loaded with a plurality of optical disks each of which is piled through a partition sheet having a held area projecting from an edge of the optical disk and not overlapping with the optical disk in the case that the optical disk and the partition sheet are piled;

an optical disk sucking unit which sucks an upper surface of the optical disk which is loaded on the tray;

a partition sheet sucking unit which sucks the partition sheet through sucking the held area; and a holding means to suck and to hold, at least, one of the optical disk and the partition sheet, wherein the holding means moves to an optical disk drive.

Moreover, an optical disk apparatus according to the present invention includes:

a tray to be loaded with a plurality of optical disks each of which is piled through a partition sheet having an optical disk exposing area not overlapping with the optical disk in the case in that the optical disk and the partition sheet are piled;

an optical disk sucking unit which sucks an upper surface of the optical disk, which is loaded on the tray, in the optical disk exposing area;

a partition sheet sucking unit which sucks an upper surface of the partition sheet; and a holding implement which sucks and holds, at least, one of the optical disk and the partition sheet, wherein the holding implement moves to an optical disk drive.

Effect of the Invention

According to the present invention, it is possible to provide the optical disk case which piles and stocks the optical disks compactly without making the optical disk have specific structure. According to the present invention, it is possible to transport the optical disk to the optical disk drive at a high speed.

BRIEF DESCRIPTION OF THE DRAWINGS

FIG. 26 is a perspective view showing a process in which the optical disk is set to a second optical disk drive.

FIG. 27 is a perspective view showing a state that the picker, which holds the partition sheet, leaves from the optical disk drive after the disks are set to two optical disk drives.

BEST MODE TO CARRY OUT THE INVENTION

Figure 1:
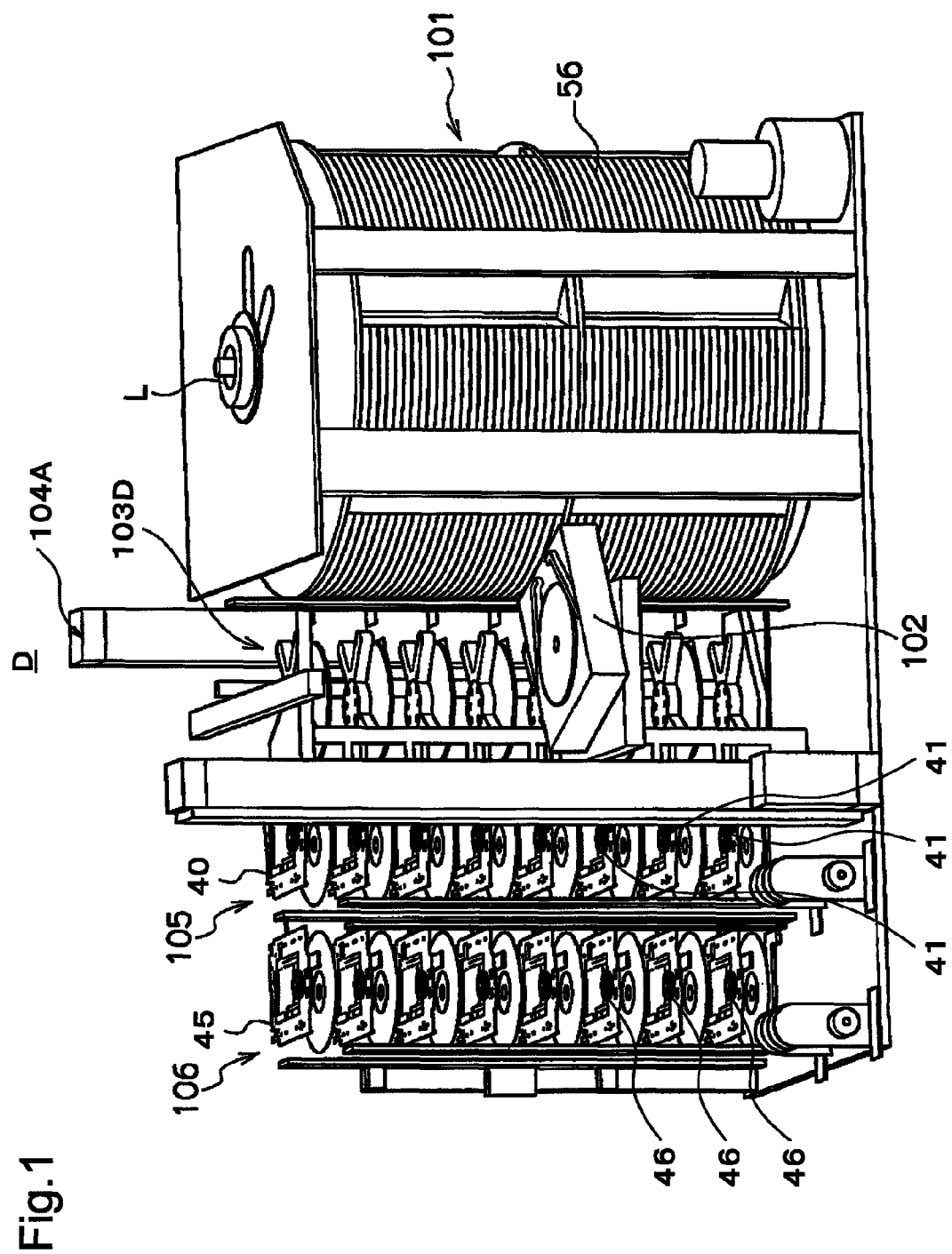
FIG. 1 is a perspective view showing an example of an optical disk recording and regenerating apparatus according to the present invention.

Hereinafter, an exemplary embodiment of the present invention will be described referring to a drawing. FIG. 1 shows an example of an optical disk recording and regenerating apparatus D according to a first exemplary embodiment of the present invention. The optical disk recording and regenerating apparatus D includes a cylinder type rotary stocker 101 which stocks a plurality of optical disk cases, and a cartridge picker 102 which picks an optical disk case 55. Moreover, the optical disk recording and regenerating device D includes an arranging mechanism 103 to arrange a plurality of trays, which are loaded on the picked optical disk case 55, in a direction of thickness of the trays with leaving space between the trays. Moreover, the optical disk recording and regenerating apparatus D includes a transporting mechanism 104 which takes out the optical disk from the arranged tray and transports the optical disk, which is taken out, to two groups of optical disk drives 105 and 106. The rotary stocker 101 can rotate around a rotary axis L which is arranged at a central position of the rotary stocker 101 and extends upward and downward. Six optical disk cases 55 are arranged at an equal interval along a circumference of a circle whose center is the rotary axis L. A part of a side surface of the optical disk case 55 forms an outer circumferential surface of the rotary stocker 101. Moreover, the optical disk cases 55 are piled also in an axial direction of the rotary axis L. In other word, the optical disk case 55 is arranged in a circumferential direction along the outer circumferential surface which forms the side surface of the rotary stocker 101, and the optical disk case 55 is stocked in a state that the optical disk case 55 is piled in an upward and downward direction along the rotary axis L. Here, a plurality of the trays are arranged in the direction of thickness on each optical disk case 55. The optical disks are loaded on each of the plural trays in a state that the optical disks are piled in the direction of thickness. The cartridge picker 102 takes out one optical disk case 55, which is designated out of a plurality of the optical disk cases 55 stocked in the rotary stocker 101, and transports the taken-out optical disk case 55 to the arranging mechanism 103. The arranging mechanism 103 holds a plurality of trays, which are loaded on the optical disc case 55, one by one from the top and arranges a plurality of trays with leaving space between the trays.

The transporting mechanism 104 includes a plurality of the pickers which pick the optical disk existing on the tray and each of which is corresponding to each tray. The transporting mechanism 104 moves the picked optical disk to two groups of the optical disk drives 105 and 106. The first group of the optical disk drives 105 and the second group of the optical disk drives 106 includes optical disk drives 40 and 45 respectively. Here, number of the optical disk drives 40 and number of optical disk drives 45 are corresponding to number of the trays respectively. The optical disk, which is transported by the transporting mechanism 104, is loaded on the optical disk drives 40 and 45 for recording and regenerating information.

Figure 2:
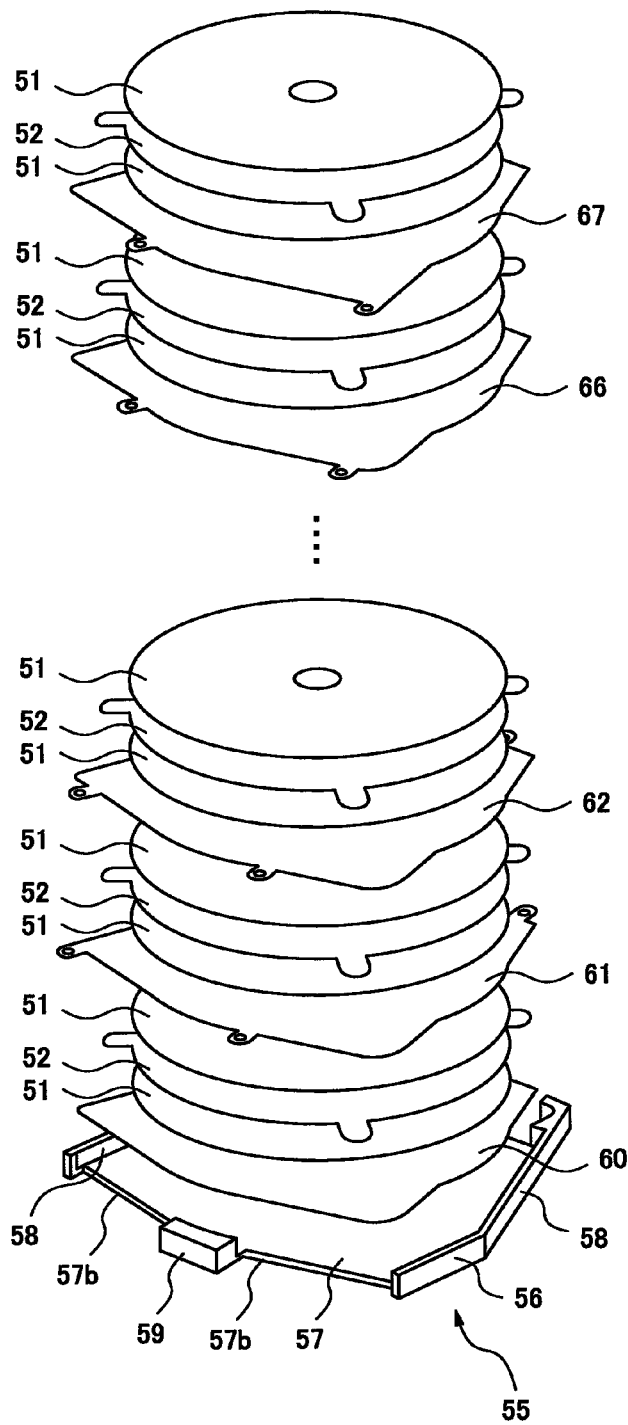
FIG. 2 is a perspective view showing a state that a constituent member of an optical disk case, and an optical disk which is inserted between the constituent members are arranged in a direction of thickness according to a first exemplary embodiment of the present invention.

FIG. 2 shows an example of the optical disk case 55. A constituent member which is included in the optical disk case 55, and the optical disc are shown in FIG. 2 in a state that the constituent member and the optical disk are arranged in a vertical direction with leaving space between the constituent member and the optical disk. A plurality of trays 60, 61 to 67, each of which is piled with two optical disks 51 and a partition sheet 52, are piled on the optical disk case 55 in a direction of thickness of the trays and stocked in the optical disk case 55. The optical disk case 55 includes a plurality of the trays 60,61 to 67 each of which is loaded with the optical disk. Moreover, the optical disk case 55 holds the trays 60,61 to 67 in a state that the trays 60,61 to 67 are piled. A side surface, which is formed through piling the trays and which is an aggregate in the direction of thickness of the tray, is supported by a case 56. Each of the trays 60,61 to 67 is loaded with a plurality of the optical disks 51. The partition sheet 52 is arranged between the optical disks 51. One optical disk 51 and the other optical disc 51 are partitioned by the partition sheet 52. Here, FIG. 1 shows an eight-layered type which includes the first tray 60 as the lowest layer to the eighth tray 67 as the highest layer. The fourth layer to the sixth layer as a middle layer are omitted in FIG. 2.

Next, the case 56, the trays 60,61 to 67 and the partition sheet 52 will be described in detail with reference to FIG. 3 and FIG. 4. An outer circumference of the case 56 has an almost heptagonal form. The case 56 has a flat loading surface 57 on which the optical disk 51 is loaded and which has a pair of side walls 58 opposite each other. Moreover, the loading surface 57 has one side edge 57a and the other side edge 57b which are opposite each other. A second side wall 59 is formed at a center of the side edge 57b. While the side edge 57a is formed flat, the side wall 57b has a form that a central part of the side wall 57b projects toward the outside slightly so that the central part may be a peak point. Moreover, the loading surface 57 is widened in a downward direction in FIG. 3. A middle portion between two side walls 58, which are a right side wall and a left side wall respectively, has a part which forms a ridgeline. Moreover, the loading surface 57 has a cylinder type projecting part 57c at a center of this sheet. The side wall 58 projects in a direction of loading the optical disks along a side edge of the loading surface 57 which has the above-mentioned form. Moreover, a projecting part 58a, which is united with each of the first side walls 58, is formed so as to extend from a position of the side edge 57a of the loading surface 57 in a direction opposite to the second side wall 59. The projecting part 58a prevents a tray handling part described later, which is formed on each of the trays 60, 61 to 67, from touching an external object. The second side wall 59, which is arranged on the side edge 57b of the loading surface 57, projects at a center of the side edge 57b in a direction of loading the optical disks 51. The second side wall 59 prevents the optical disk 51, which is loaded on the case 56, from dropping from the side edge 57b. While an outer surface of the second side wall 59, which is a low end wall in FIG. 3, is flat, an inner surface of the second side wall 59 is out-curved so that the inner surface may be fitted with a shape of a circumferential edge of the optical disk 51.

Next, the trays 60,61 to 67 will be, described. The optical disk case 55 according to the exemplary embodiment includes the trays 60, 61 to 67. The trays are piled eightfold. The optical disk 51 is loaded on each tray. The tray 60 out of the trays 60, 61 to 67 is arranged directly on the loading surface 57 of the case 56. Seven trays 61 to 67 are piled in this order above the first tray 60. Each external form of the trays 60,61 to 67 is almost heptagonal. Each outer edge of the trays 60,61 to 67 is formed smaller than an outer edge of the loading surface 57 of the case 56 so that the trays 60,61 to 67 may be arranged inside the first side wall 58 and inside the second side wall 59 of the case 56. Side edges 601, 611, 621 to 671 of the trays 60, 61, 62 to 67 respectively, whose positions are corresponding to a position of the side edge 57a of the loading surface 57, are flat. Meanwhile, each center of side edges 602, 612, 622 to 672, whose positions are corresponding to a position of the side edge 57b of the loading surface 57, projects toward the outside. Moreover, each of the trays 61 to 67, which form a sevenfold upper layer on the tray 60, includes one tray handling part located at an upper edge in FIG. 3, and two tray handling parts located at a lower edge. The tray handling part projects toward the outside. Out of tray handling parts 61a to 67a which are formed on the side edges 611 to 671 of the trays 61 to 67 respectively, the tray handling part 61a of the second tray 61, which is corresponding to the lowest layer, is at the rightmost position. The positions of the tray handling parts 62a to 67a of the trays 62 to 67 respectively, which are arranged above the tray 61, shift to the left side gradually in this order.

Figure 3:
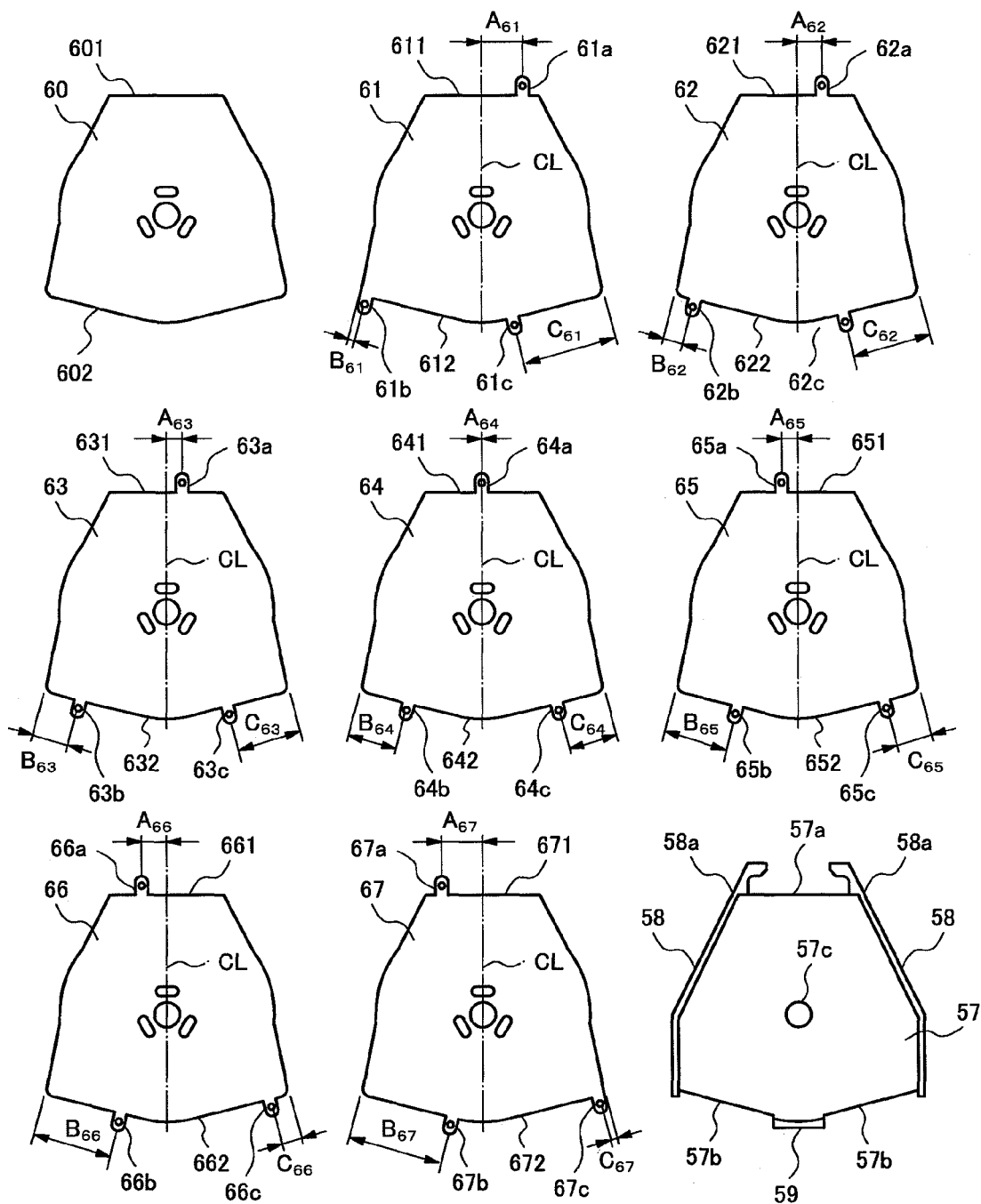
FIG. 3 is a plan view of a tray and a case which is included in the optical disk case shown in FIG. 2.
Figure 4:
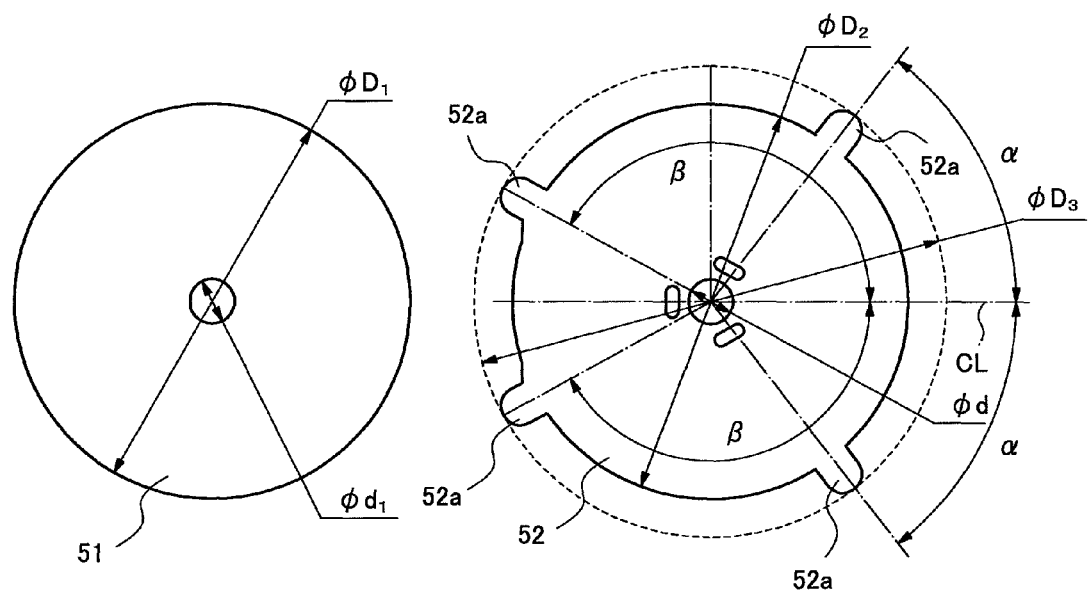
FIG. 4 is a plan view of a partition sheet and the optical disk which are used in the optical disk case shown in FIG. 2.

FIG. 3 shows each position of the tray handling parts 61a to 67a of the trays 61 to 67 respectively together with a distance from a centerline CL of the tray. The second tray 61 to the fourth tray 63 have the tray handling parts 61a, 62a and 63a respectively in a right side area of the centerline CL. The tray handling part 64a of the fifth tray 64 is formed at a center of the side edge 641. The trays 65, 66 and 67, which are arranged above the fifth tray 64, have the tray handling parts 65a, 66a and 67a respectively in a left side area of the centerline CL. Specifically, the tray handling part 61a of the tray 61 is far from the centerline CL by a distance A61. The distances of the tray handling parts 62a and 63a of the trays 62 and 63 respectively from the centerline CL become short in this order. Each distance is shorter than the distance A61. The tray handling part 64a of the tray 64 is at a center position, that is, a distance A64 is equal to zero exactly. Furthermore, the trays 65, 66 and 67, which are arranged above the tray 64, have the tray handling parts 65a, 66a and 67a which are far from the centerline CL by a distance A65, a distance A66 and a distance A67 respectively. The distance A65, the distance A66 and the distance A67 become long in this order. Meanwhile, two tray handling parts, which are formed on each of the side edges 602, 612 to 672, are located in the right side area and in the left side area of the centerline CL respectively. Positions of tray handling parts 61b to 67b, which are arranged in the left side area of the centerline CL, shift gradually from the left side edge to the center side in a layer ascending order. Meanwhile, positions of tray handling parts 61c to 67c, which are arranged in the right side area of the centerline CL, shift gradually from the center toward the right side edge in a layer ascending order. FIG. 3 shows the positions of the tray handling parts 61b to 67b which are on the left side of the centerline CL, and distances of the tray handling parts 61b to 67*b* from the left side edges of the trays 61 to 67 respectively. The first tray 61 has the tray handling part which is far from the left side edge by a distance B61. The distance becomes long gradually in a layer ascending order. A distance B62 to a distance B67 become long gradually in this order and the tray handling part is arranged far by each distance. FIG. 3 shows the positions of the tray handling parts 61*c* to 67*c*, which are in the right side area of the centerline CL, together with distances of the tray handling parts 61*c* to 67*c* from the right side edges of the trays 61 to 67 respectively. The tray 61 has the tray handling part at a position C61. A distance of the position of the tray 61 from the right side edge is the longest. The distance becomes short gradually in a layer ascending order. A distance C62 to a distance C67 become short gradually in this order. The tray handling parts are arranged far by the distances C62 to the distance C67 respectively. The tray handling parts 61*a* to 67*a*, 61*b* to 67*b*, and 61*c* to 67*c* are used when the trays 60 to 67, which are piled by the arranging mechanism, are arranged in the direction of thickness with leaving space between the trays. The tray handling parts 61*a* to 67*a*, 61*b* to 67*b*, and 61*c* to 67*c* are used to support each tray in turn. Here, each of the trays 60 to 67 has a circular hole in its center. Three long holes are formed around the circular hole. A position of the circular hole, which is formed in each of the trays 60 to 67, is corresponding to the position of the circular projection part 57C which is formed on the case 56 mentioned above. When the trays 60 to 67 are piled and loaded on the case 56, each position of the holes is coincident with the position of the projection part 57*c*.

Figure 5:
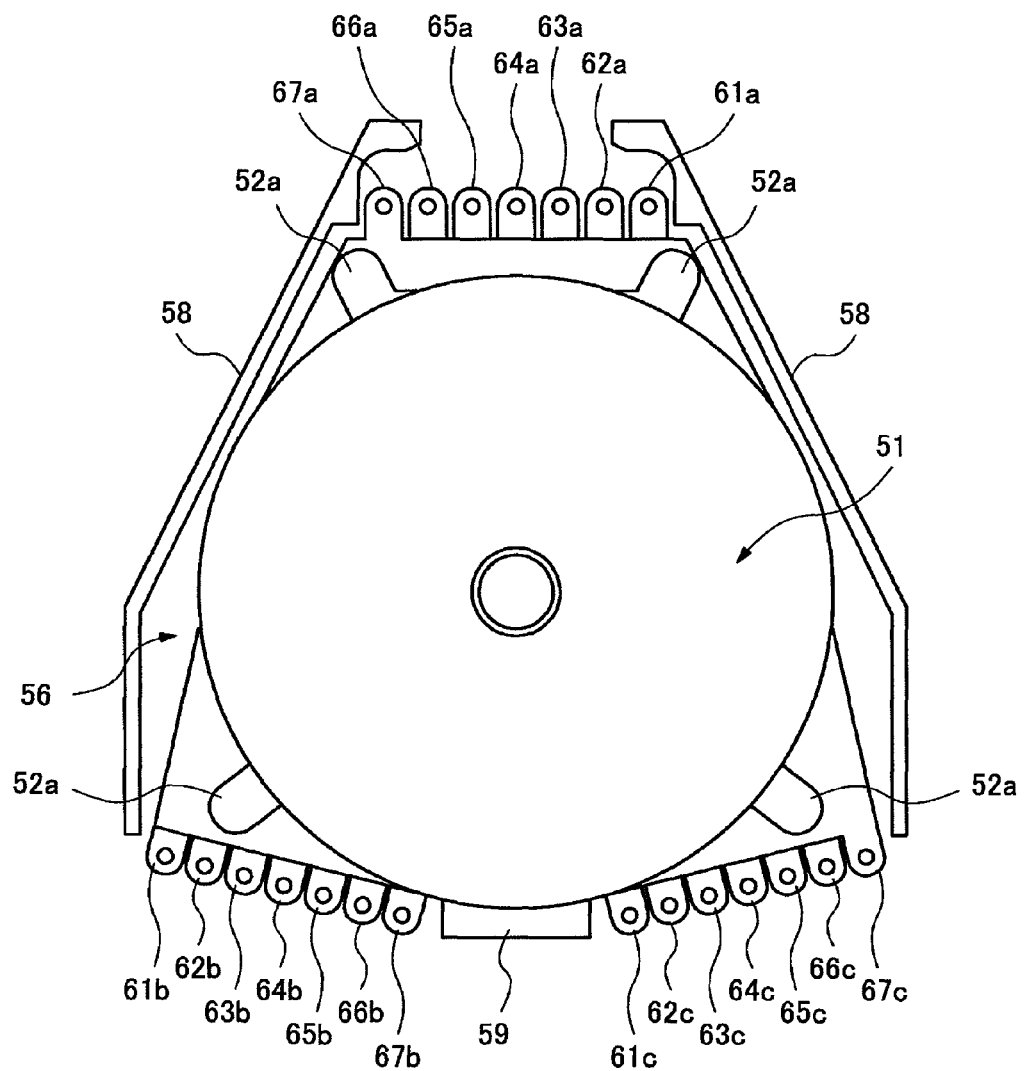
FIG. 5 is a plan view of the optical disk case showing a state that the tray and the optical disk are piled and loaded on the optical disk case.
Figure 6:
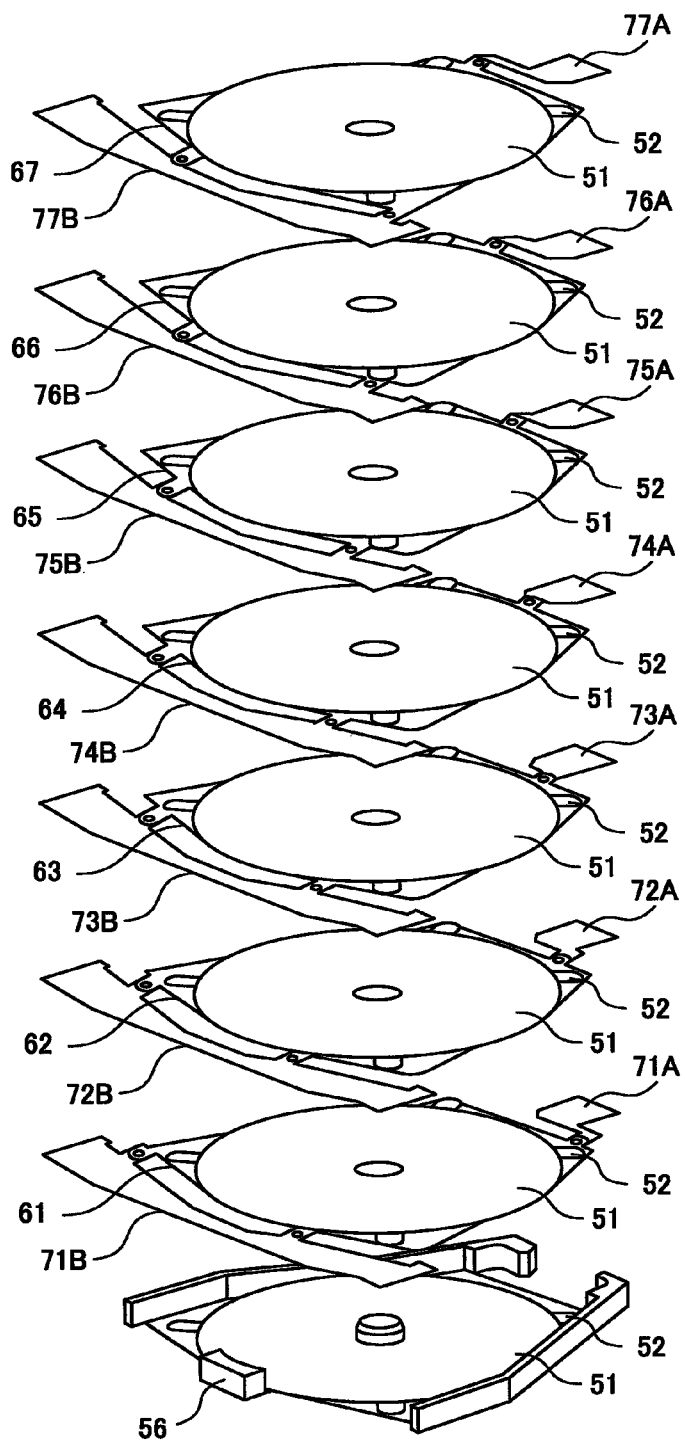
FIG. 6 is a perspective view of a state that an arranging mechanism arranges a plurality of the optical disks in a direction of thickness of the optical disks with leaving space between the optical disks.
Figure 7:
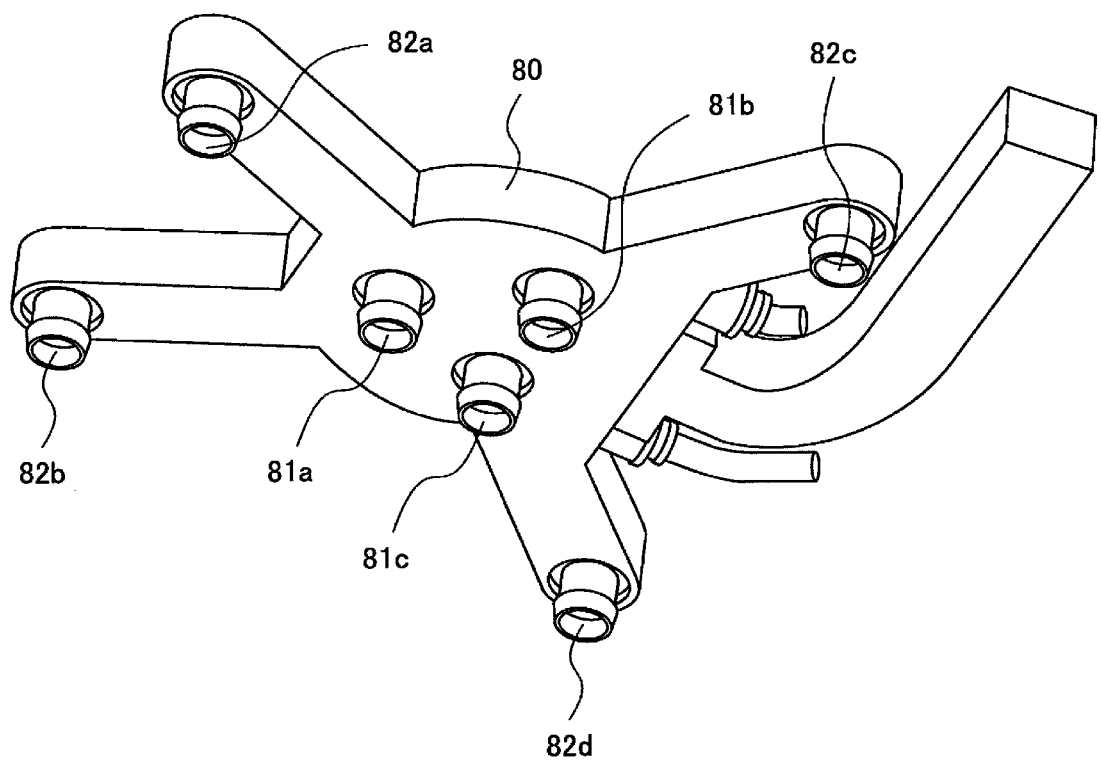
FIG. 7 is a perspective view showing an example of a picker which is included in the optical disk recording and regenerating apparatus according to the present invention.

Next, the partition sheet 52 which partitions the optical disks 51 will be described. FIG. 4 shows a plan view of the optical disk 51 and the partition sheet 52. An outer circumference of the optical disk 51 is formed circularly, and the optical disk 51 has a circular hole in its center. An outer diameter of the optical disk 51 shown in FIG. 4 is denoted as $\phi$ D1 and an inner diameter of the hole is denoted as $\phi$ d1. An outer circumferential edge of the partition sheet 52 is almost circular. The partition sheet 52 has four held areas 52*a*, each of which is corresponding to the partition sheet handling part and projects radially toward the outside, at a circumferential edge of the partition sheet 52. The held areas 52*a* are at line-symmetric positions each other with making a centerline CL of the partition sheet 52 a symmetry axis. Two held areas are arranged in one side area of the centerline CL and the left two held areas are in the other side area. Moreover, the partition sheet 52 has a hole at its center. Three long holes are formed around the hole. An outer diameter $\phi$ D2 of the partition sheet 52 is almost the same in size as the outside diameter $\phi$ D1 of the optical disk 51. Moreover, a tip point of each held area 52*a* is located on a circumference of a circle whose center is coincident with the center of the partition sheet 52 and whose diameter is $\phi$ D3. For this reason, the held area 52*a* projects from the outer circumferential edge of the optical disk 51 toward the outside in the case that the partition sheet 52 is arranged between the optical disks 51. That is, the outer circumferential edge of the partition sheet is located at the outside of the outer circumferential edge of the piled optical disk 51 in a direction of the diameter of the optical disk 51. That is, the partition sheet includes an area which does not overlap with the optical disk 51. The area is just the held area 52*a*. FIG. 4 shows the position of the held area 52*a* and a center angle of the held area 52*a* with the centerline CL. A pair of the held areas 52*a* are located at the positions whose center angles are a counterclockwise angle $\alpha$ with the centerline CL and a clockwise angle $\alpha$ respectively. Another pair of the held areas 52*a* are located at the positions whose center angles are an counterclockwise angle $\beta$ with the centerline CL and a clockwise angle $\beta$ respectively. The optical disk 51 is stocked in the optical disk case 55 by use of the case 56, the trays 60 to 67 and the partition sheet 52 which are described above. As shown in FIG. 1, the first tray 60 is loaded directly on the loading surface 57 of the case 56. Then, the optical disk 51, the partition sheet 52 and the optical disk 51 are piled in this order on the first tray 60. At this time, the side edge 601 of the first tray 60 is faced to the narrow side edge 57*a* of the case 56, and the side edge 602 is faced to the side edge 57*b* of the case 56. As a result, the first tray 60 is arranged inside the first side wall 58 and inside the second side wall 59 of the case 56 on the loading surface 57. The second tray 61, the optical disk 51, the partition sheet 52 and the optical disk 51 are loaded in this order above the lowest layer. Similarly, two optical disks 51, between which the partition sheet 52 intervenes, are piled on each of the third tray 62 to the eighth tray 67 in turn. Here, the second tray 61 to the eighth tray 67 are faced in the same direction as the direction of the first tray 60. At this time, the optical disk 51, the partition sheet 52 and each of the trays 60 to 67 are piled concentrically. Furthermore, a position of the circular hole, which is formed at each center of the optical disk 51, the partition sheet and the trays 60 to 67, is coincident with a position of the projection part 57*c* which is formed on the loading surface 57 of the case 56. In the case of being piled as mentioned above, the tray handling parts 61*a* to 67*a*, which are formed on the side edges 611 to 671 of the trays 61 to 67 respectively, project toward the outside of the case 56 from the side edge 57*a* of the case 56 (FIG. 3) as shown in FIG. 5. The tray handling part 61*a* of the second tray 61 out of the tray handling parts 61*a* to 67*a* is at the rightmost position in FIG. 5. The positions of the tray handling parts 62*a* to 67*a* of the third tray 62 to the eighth tray 67 shift to the left side of the figure in this order along the side edges 621 to 671 of the trays respectively. Similarly, the tray handling part 61*b* to 67*b*, and 61*c* to 67*c*, which are formed on the side edges 612 to 672 respectively, project from the side edge 57*b* of the case 56 toward the outside of the case 56. The tray handling parts 61*b* and 61*c* of the second tray 61 out of the tray handling parts 61*b* to 67*b*, and 61*c* to 67*c* are at the leftmost positions. The position of the tray handling part shifts to the right side along the side edge 57*b* in a layer ascending order. The tray handling parts 67*b* and 67*c* of the eighth tray 61 out of the tray handling parts 61*b* to 67*b*, and 61*c* to 67*c* are at the rightmost positions in FIG. 5. As a result, the tray handling parts 61*a* to 67*a*, 61*b* to 67*b*, and 61*c* to 67*c* which are formed on the trays 61 to 67 respectively are arranged in a state that the positions of the tray handling parts 61*a* to 67*a*, 61*b* to 67*b*, and 61*c* to 67*c* shift each other without overlapping each other. Moreover, in the case that the optical disk 51 and the partition sheet 52 are piled on each of the trays 60 to 67, the held area 52*a* of the partition sheet does not overlap with the optical disk 51. The held area 52*a* is in a state of sticking out from the outer circumferential edge of the optical disk 51. Each of the trays 60 to 67, which are loaded on the optical disk case 55 described above, is arranged by the arranging mechanism 103 in the direction of thickness of the trays with leaving space between the trays. FIG. 6 shows a state that the arranging mechanism 103, which is included in the optical disk recording and regenerating apparatus D, arranges the first tray 60 to the eighth tray 67. The arranging mechanism 103 includes a lifting apparatus, and a supporting body to support the trays 61 to 67, which are loaded on the optical disk case, one by one. Here, the lifting apparatus and the supporting body are not shown in the figure. The lifting apparatus has a lifting table, which is loaded with the optical disk case 55, move up and down within the lifting apparatus. Meanwhile, the supporting body includes supporting boards 71A to 77A whose number is corresponding to number of the second tray 61 to the eighth tray 67, and supporting boards 71B to 77B whose number is also corresponding to number of the second tray 61 to the eighth tray 67. The supporting boards 71A to 77A, and 71B to 77B are arranged so as to surround the optical disk case 55 which moves up and down. The supporting boards 71A to 77A, and 71B to 77B are arranged in a direction of lifting the optical disk case 55 with leaving fixed space between the supporting boards. Moreover, a projection, which projects in a moving direction of the optical disk case 55, is formed on each of the supporting boards 71A to 77A. Moreover, two projections, which project in the moving direction of the optical disk case 55, are formed on each of the supporting boards 71B to 77B. The projections, which are formed on the supporting boards 71A to 77A, and 71B to 77B, support the second tray 61 to the eighth tray 67 respectively, which are piled, sequentially from the top. A position of the projection is corresponding to the position of the tray handling part of each tray. That is, the supporting boards 71A and 71B have a total of three projections whose positions are corresponding to the positions of the tray handling parts 61a, 61b and 61c of the second tray 61. The cases of the third tray 62 to the eighth tray 67 are similar to the case of the second tray 61. Moreover, the position of each projection shifts from the position of the projection which is formed on another supporting board, and consequently each of the projections does not overlap:

FIG. 7 is a detailed view of a picker 80 which is included in the transporting mechanism 104. The picker 80 includes a set of three optical disk sucking pads 81a to 81c to suck an upper surface side of a periphery of the hole which is arranged at the center of the optical disk 51. The picker 80 includes a set of four optical disk sucking pads 82a to 82d which are arranged outside the optical disk 51 and suck upper surface sides of four held areas 52a respectively. Each of three optical disk sucking pads 81a to 81c is a sucker type member made of rubber or the like. The optical disk sucking pads 81a to 81c are combined into one system by the manifold, and are connected to a vacuum pump, which is not shown in the figure, via a pressure-resistant tube or the like. For this reason, a work of sucking and releasing each optical disk 51 is carried out through making a vacuum by the on and off operation of the vacuum pump or the open and close operation of the electromagnetic valve. Similarly, each of the optical disk sucking pads 82a to 82d is a sucker type member made of rubber or the like. The partition sheet sucking pads 82a to 82d are combined into one system by the manifold, and are connected to a vacuum pump, which is not shown in the figure, via a pressure-resistant tube or the like. A work of sucking and releasing each partition sheet 52 by use of the partition sheet sucking pads 82a to 82d is carried out through making a vacuum by the on and off operation of the vacuum pump or the open and close operation of the electromagnetic valve. A control system for the optical disc sucking pads 81a, 81b, 82c and 81d and a control system for the partition sheet sucking pads 82a, 82b, 82c and 82d are independent mutually. Both of the control systems may work separately, and may work simultaneously. In the case that both the control systems carry out the sucking control simultaneously, the picker 80 makes the optical disk sucking pads 81a, 81b and 81c and the partition sheet sucking pads 82a, 82b and 82c suck the optical disk 1 and the partition sheet 2 respectively. By the sucking control, the picker 80 can carry out an operation of transporting the optical disk 1 and the partition sheet 2. Here, the case that the picker described above holds the partition sheet by use of sucking force of the vacuum pump is exemplified. However, a method of the picker holding the partition sheet is not limited to the method mentioned above. For example, it may be preferable that magnetic material is stuck on a surface of the partition sheet handling part of the partition sheet and the picker has an electromagnet instead of the partition sheet sucking pad according to the exemplary embodiment. According to the structure mentioned above, in the case that the electromagnetic of the picker is ON, the electromagnetic holds the partition sheet. On the other hand, in the case that the electromagnet is OFF, the picker releases the partition sheet.

A work of the picker 80 will be described in detail in a second exemplary embodiment.

Next, the optical disk recording and regenerating apparatus D according to the second exemplary embodiment of the present invention will be described.

Figure 8:
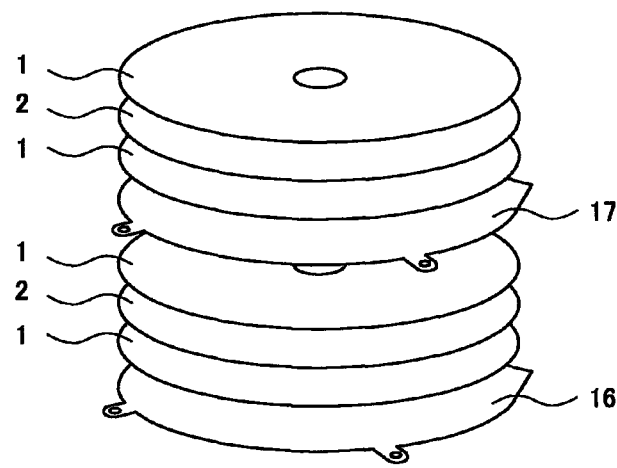
FIG. 8 is a perspective view showing a state that a constituent member of an optical disk case which is used in an optical disk recording and regenerating apparatus, and an optical disk which is inserted between the constituent members are arranged in a direction of thickness according to a second exemplary embodiment of the present invention.
Figure 8:
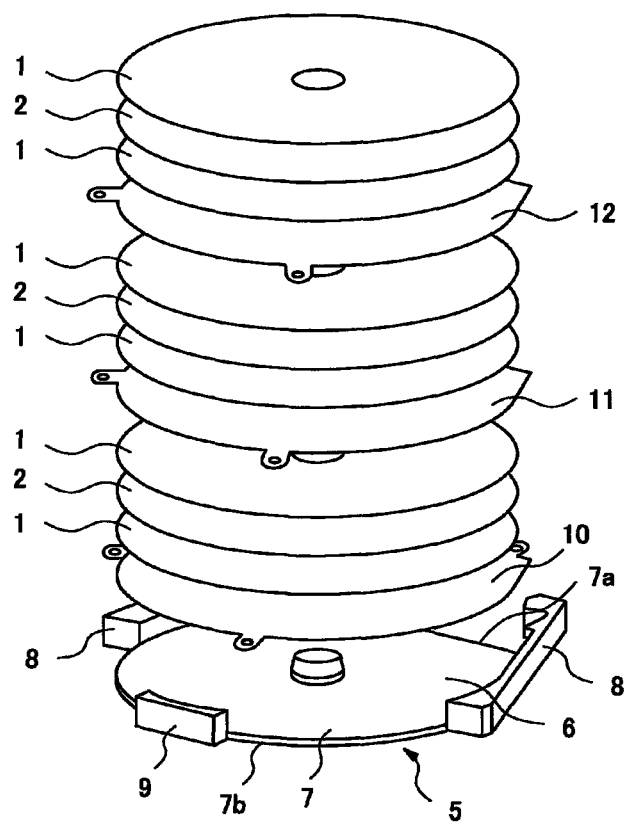

FIG. 8 shows a state that a constituent member of an optical disk case 5, and an optical disk 1 are arranged in a vertical direction with leaving space between the constituent member and the optical disk 1. The optical disk case 5 includes a plurality of trays 10 to 17 which is loaded with the optical disk 1, a case 6 piled and loaded with the tray 10 to 17 each of which is loaded with the optical disk 1, and a partition sheet 2 which intervenes between the optical disks 1. Here, FIG. 8 shows an eight-layered type which includes the first tray 10 as the lowest layer to the eighth tray 17 as the highest layer. The fourth layer to the sixth layer as middle layers are omitted in FIG. 2.

Figure 9:
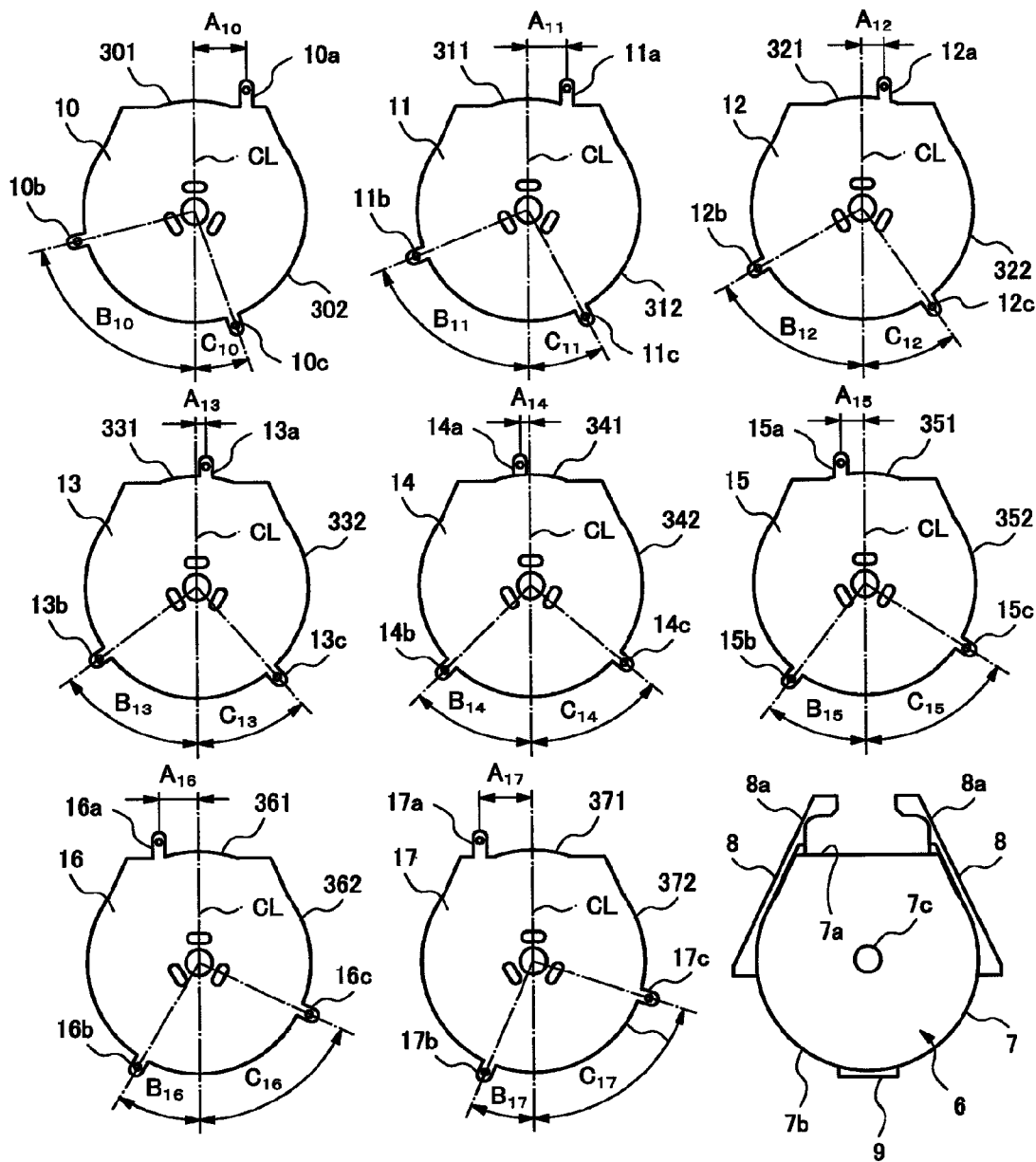
FIG. 9 is a plan view of a tray and a case which is included in the optical disk case shown in FIG. 8.
Figure 10:
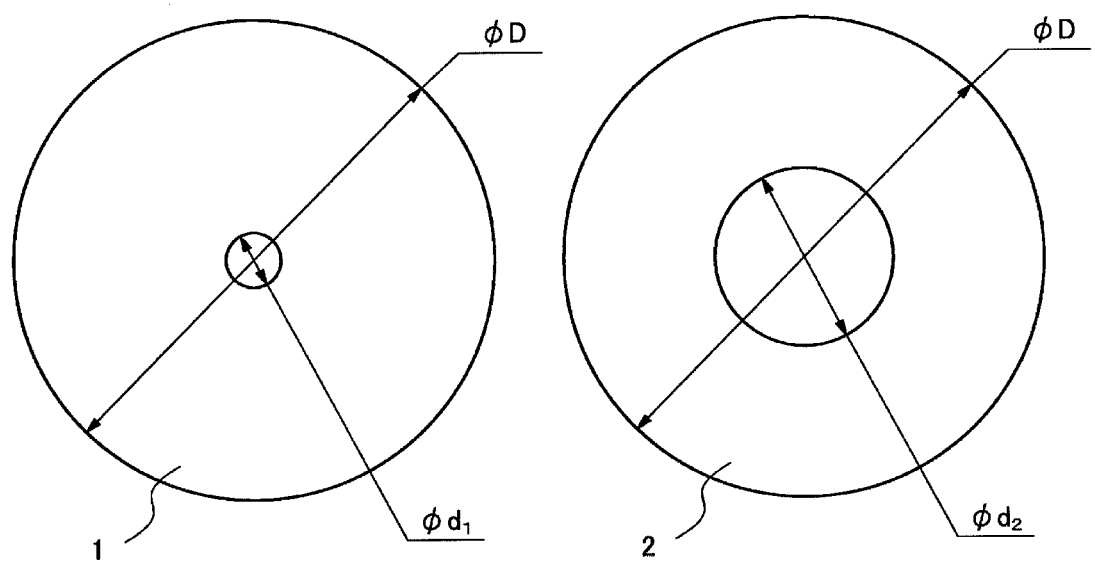
FIG. 10 is a plan view of the partition sheet and the optical disk which are used in the optical disk case shown in FIG. 8.

FIG. 9 shows the case 6, and the trays 10 to 17, and FIG. 10 shows the optical disk 1 and the partition sheet 2. An outer form of an upper side of the case 6 shown in FIG. 9 is an approximate trapezoid and an outer form of a lower side is semicircular. The case 6 includes a flat loading surface 7 on which the optical disk 1 is arranged, first side walls 8 which form a pair of the side edges of the approximate trapezoid, a second side wall 9 which is arranged at a central part of a side edge 7b of the loading surface 7. A side edge 7a, which is on an upper side of the loading surface 7 in FIG. 9, is flat, and the side edge 7b, which is opposite to the side edge 7a, is semicircular. An upper half of the loading surface 7 becomes narrow in width toward the side edge 7a and has an approximate trapezoid form. Moreover, the loading surface 7 has a cylinder type projection 7c at its center. The first side wall 8 is formed along the side edge of the loading surface 7, which is in the trapezoid form, in a direction of loading the optical disk 1. Moreover, a projecting part 8a, which is united with each of the first side walls 8, extends from a position of the side edge 7a of the loading surface 7 in an upward direction in the figure. The projecting part 8a prevents a tray handling part, which is formed on the tray and will be described later, from touching an external object. The second side wall 9, which is formed on the side edge 7b of the loading surface 7, prevents the optical disk 1, which is loaded on the case 6, from dropping from the side edge 7b. The second side wall 9 is arranged so as to be projecting in a direction of thickness of the loaded optical disk 1. While an outer surface of the second side wall 9 is flat, an inner surface is out-curved so that the inner surface may be fitted with a form of the outer circumferential edge of the optical disk 1.

Next, the trays 10 to 17 will be described. The optical disk case 5 according to the exemplary embodiment are piled with the trays eightfold to stock the optical disk 1. The optical disk case 5 includes eight trays of the first tray 10 to the eighth tray 17. Each of the trays 10 to 17 has an outer form of the approximate trapezoid on a side toward the side edge 7a of the loading surface 7. Moreover, while each central part of side edges 301 to 371 projects slightly in an arcuate form, the side edges 301 to 371 are almost flat. In contrast, each of the trays 10 to 17 is formed in a semicircle on a side toward the side edge 7b of the loading surface 7, and side edges 302 to 372 extend toward the outside in an arcuate form. Since each area of the trays 10 to 17 is smaller than one of the loading surface 7 of the case 6, it is possible to arrange each tray inside the first side wall 8 and inside the second side wall 9 of the case 6. The trays 10 to 17 include tray handling parts 10a to 17a, which project toward the outside, on the side edges 301 to 371 respectively, and furthermore include tray handling parts 10b to 17b, and 10c to 17c, which project toward the outside, on side edges 302 to 372 respectively. FIG. 9 shows that positions of the tray handling parts 10a to 17a, which are formed on the side edges 301 to 371 of the trays 10 to 17, shift each other in a direction along the side edges 301 to 371 respectively. Meanwhile, positions of the tray handling parts 10b to 17b, and 10c to 17c, which are formed on the side edges 302 to 307 respectively, shift each other in a circumferential direction along the side edges 302 to 372 respectively. FIG. 9 shows positions of the tray handling parts 10a to 17a, and distances of the tray handling parts 10a to 17a from centerlines CL of the trays respectively. Moreover, FIG. 9 shows positions of the tray handling parts 10b to 17b, and 10c to 17c, and center angles of the tray handling parts 10b to 17b, and 10c to 17c with the centerline CL of the trays respectively. The tray handling parts 10a to 13a of the first tray 10, which is the lowest layer, to the fourth tray 13, which is the fourth layer, respectively out of the tray handling parts 10a to 17a on the side edges 301 to 371 respectively are arranged in a right side area of the centerline CL in FIG. 9. Meanwhile, the tray handling parts 14a to 17a of the fifth tray 14, which is the fifth layer, to the eighth tray 17, which is the highest layer, respectively are arranged in a left side area of the centerline CL in FIG. 9. The tray handling part 10a of the first tray 10 is far from the centerline CL by a distance A10. The tray handling parts 11a, 12a and 13a of the second tray 11 to the fourth tray 13 are far from the centerline CL by a distance A11, a distance A12 and a distance A13 respectively. The distance A11, the distance A12 and the distance A13 become short in this order and shorter than the distance A10. Moreover, the tray handling parts 14a to 17a of the fifth tray 11 to the eighth tray 13 are far from the centerline CL by a distance A14, a distance A15, a distance A16 and a distance A11 respectively. The distance A14, the distance A15, the distance A16 and the distance A17 become long in this order. Meanwhile, the tray handling parts 10b to 17b, and 10c to 17c, which are formed on the side edges 302 to 372 respectively, are arranged in two different side areas of the centerline CL in FIG. 9. The positions of the tray handling parts 10b to 17b, which are arranged in the left side area of the centerline CL, shift gradually from the left toward the center side on the left side edge in FIG. 9 in a layer ascending order. Meanwhile, the positions of the tray handling parts 10c to 17c, which are arranged in the right side area of the centerline CL, shift gradually from the center toward the right side on the right side edge in a layer ascending order. The positions of the tray handling parts 10b to 17b, which are arranged in the left side area of the centerline CL, are indicated by clockwise angles with the centerline. The first tray 10 has the tray handling part 10b at a position whose clockwise angle with the centerline is an angle B10. Angles B11, B12 to B17 with the centerline CL become small in this order. That is, the angle of the tray handling part with the centerline becomes small in a layer ascending order. Meanwhile, the positions of the tray handling part 10c to 17c, which are arranged in the right side area of the centerline CL, are indicated by counterclockwise angles with the centerline. The first tray 10 has the tray handling part 10c at a position whose counterclockwise angle with the centerline is an angle C10. Angles C11, C12 to C17 with the centerline become large in this order. The tray handling parts 10a to 17a, 10b to 17b, and 10c to 17c are used to support the trays in turn when an arranging mechanism arranges the piled trays in the direction of thickness of the trays. Here, each of the trays 10 to 17 has a circular hole at its center. Each of the trays 10 to 17 has three long holes around the circular hole so that three long holes may surround the hole. A position of the circular hole, which is arranged at each center of the trays 10 to 17, is corresponding to a position of the cylinder type projecting part 7c which is formed on the loading surface 7 of the case 6 mentioned above. When the trays 10 to 17 are piled and loaded on the case 6, the positions of the holes are coincident with the position of the projecting part 7c.

Next, the partition sheet 2, which intervenes between any two optical disks 1 out of a plurality of the optical disks overlapping each other, will be described. FIG. 10 is a plan view of the optical disk 1 and the partition sheet 2. The optical disk 1 has a circular outer circumference and has a circular hole in its center. It is assumed that an outer diameter of the optical disk 1 shown in FIG. 10 is denoted as y D and an inner diameter of the hole is denoted as $\phi$ d1. The partition sheet 2 has a circular outer circumferential edge and has a circular hole at its center. An outer diameter of the partition sheet 2 is denoted as $\phi$ D which is the same as one of the optical disks 1. Meanwhile, an inner diameter of the circular hole which is arranged at the center of the partition sheet 2 is denoted as $\phi$ d2. The inner diameter $\phi$ d2 of the partition sheet 2 is bigger than the inner diameter $\phi$ d1 of the hole of the optical disk 1. Since the inner diameter of the hole of the partition sheet 2 is bigger than one of the hole of the optical disk as mentioned above, the optical disk 1 has an area, where is not covered with the partition sheet 2, at the center of the piled optical disk 1. The area, in which the optical disk 1 does not overlap with the partition sheet 2 and consequently a part of the optical disk 1 is exposed, is an optical disk exposing area.

The optical disk 1 is stocked in the optical disk case 5 by use of the case 6, the trays 10 to 17 and the partition sheet 2 which are described above. According to FIG. 8, the first tray 10 to the eighth tray 17 are loaded in turn on the loading surface 7 of the case 6. The optical disk 1, the partition sheet 2, and the optical disk 1 are piled in this order on each tray. At this time, the trays' side edges 301 to 371, which have the tray handling parts 10a to 17a respectively, are faced to the narrow side edge 7a of the case 6. Moreover, the side edges 302 to 372, which have the tray handling parts 10b to 17b, and 10c to 17c respectively are faced to the side edge 7b of the case 6. Moreover, the optical disk 1, and the trays 10 to 17 are piled in the direction of thickness.

Figure 11:
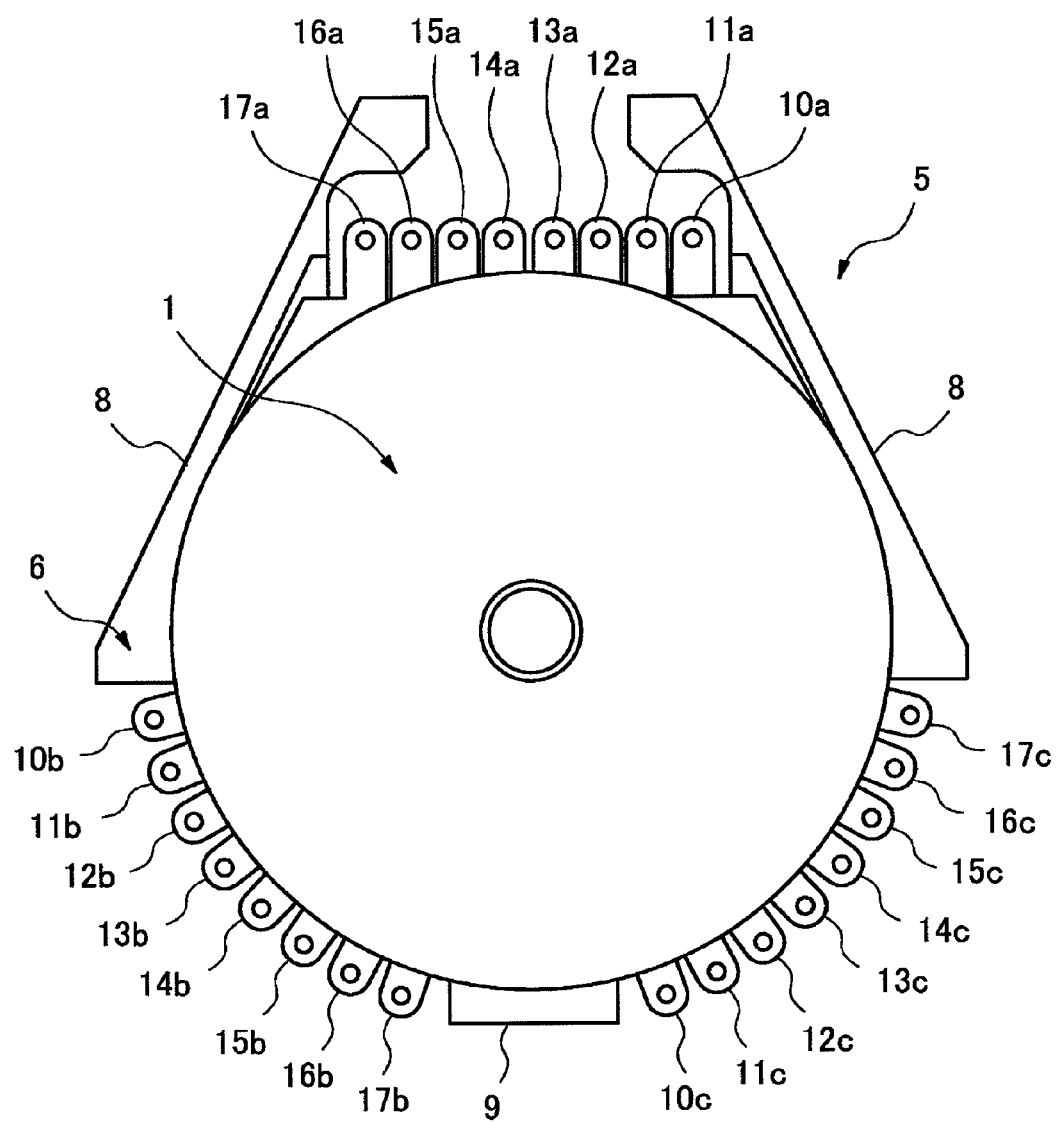
FIG. 11 is a plan view of the optical disk case showing a state that the tray and the optical disk are piled to be loaded on the optical disk case.

At this time, the position of the circular hole which is arranged at the center is coincident with the position of the cylinder type projecting part 7c which is formed on the loading surface 7 of the case 6. In contrast, the position of the partition sheet 2 is determined by the first side wall 8 and the second side wall 9 which are formed on the case 6. In the case that the trays are piled as mentioned above, the tray handling parts 10a to 17a, which are formed on the side edges 301 to 371 of the trays 10 to 17 respectively, project from the side edge 7a of the case 6 toward the outside of the case 6, as shown in FIG. 11. Then, the tray handling part 10a of the first tray 10 is at the rightmost position on the side edge 7a in FIG. 11. The positions of the tray handling parts 11a to 17a of the second tray 11 to the eighth tray 17 shift gradually toward the left side of the figure in this order along the side edges 301 to 371 of the trays respectively. The tray handling part 17a of the eighth tray 17 is at the leftmost position of the side edge 7a in FIG. 11. Meanwhile, the trays handling parts 10b to 17b, and 10c to 17c, which are formed on the side edge 302 to 372 respectively, project from the side edge 7b of the case 6 toward the outside of the case 6. Then, two tray handling parts 10b and 10c of the first tray 10 are at the leftmost end positions out of the tray handling parts 10b to 17b, and 10c to 17c respectively. The positions of the tray handling parts 11c to 17c shift gradually to the right side along the side edge 7b in a layer ascending order. The tray handling parts 17b and 17c of the eighth tray 17 are at the rightmost end positions out of the tray handling parts 10b to 17b, and 10c to 17c respectively. As a result, the tray handling parts 10a to 17a, 10b to 17b, and 10c to 17c which are formed on the trays 10 to 17 respectively are arranged in a state that the positions of the tray handling parts 10a to 17a, 10b to 17b, and 10c to 17c shift each other without overlapping each other.

Figure 12:
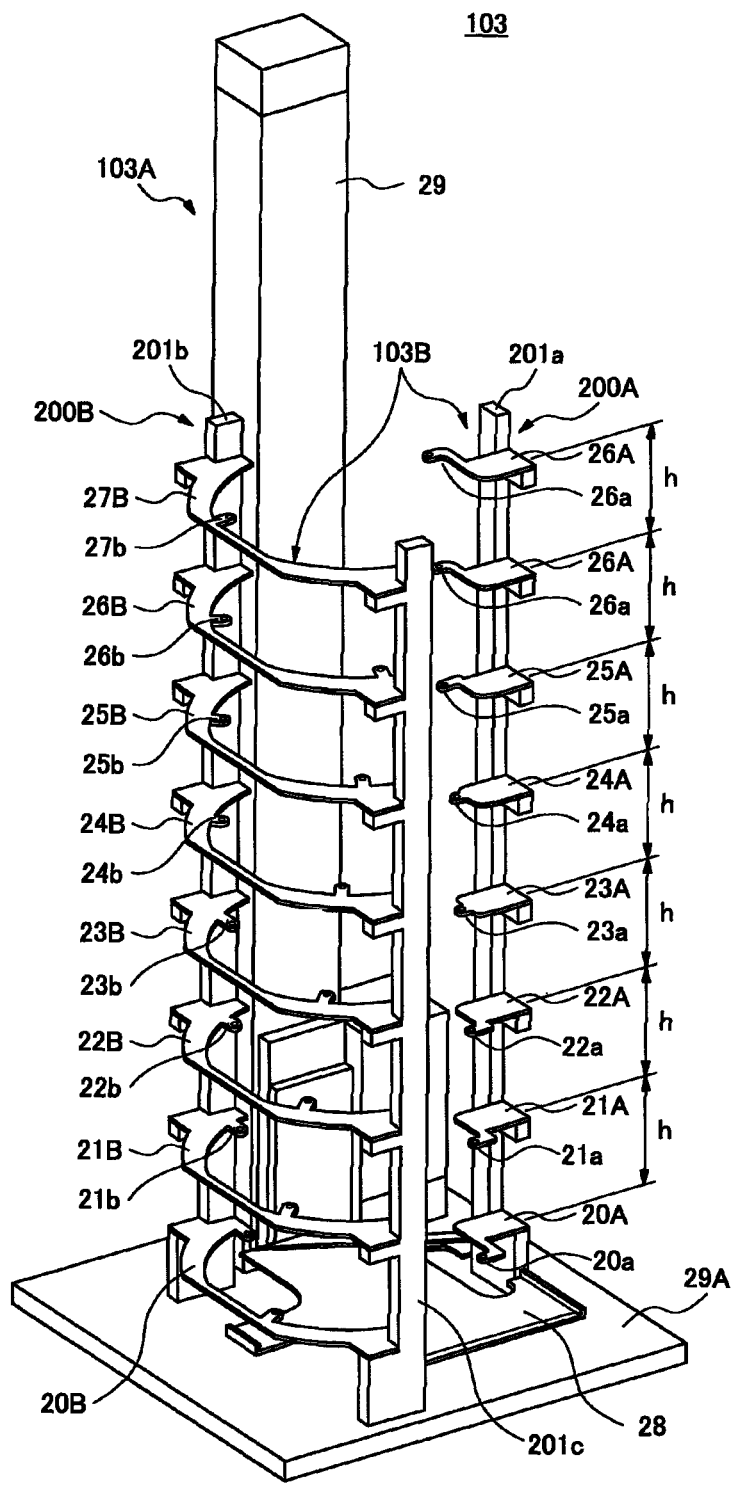
FIG. 12 is a perspective view of an arranging mechanism.
Figure 13:
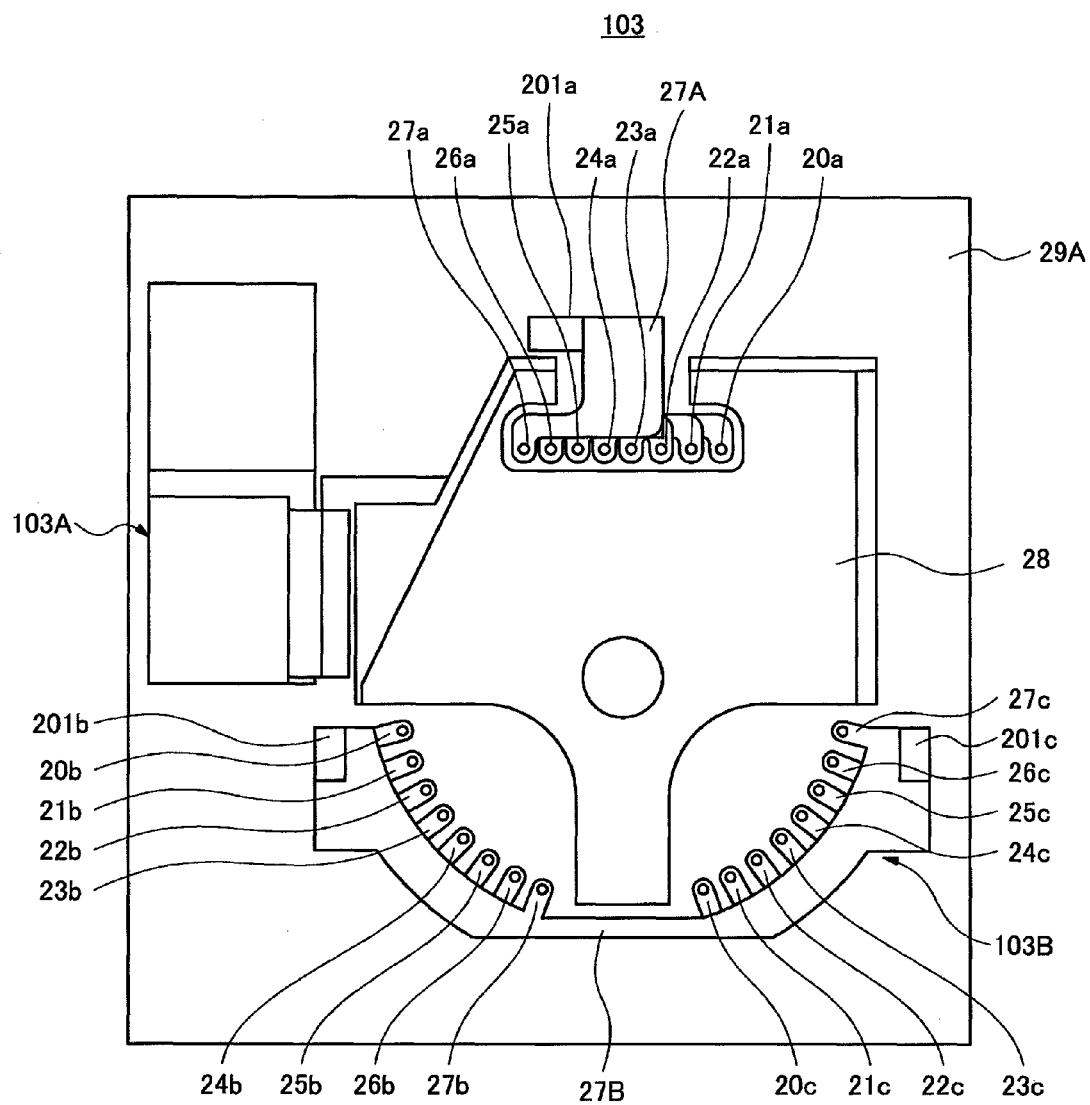
FIG. 13 is a plan view of the arranging mechanism.
Figure 14:
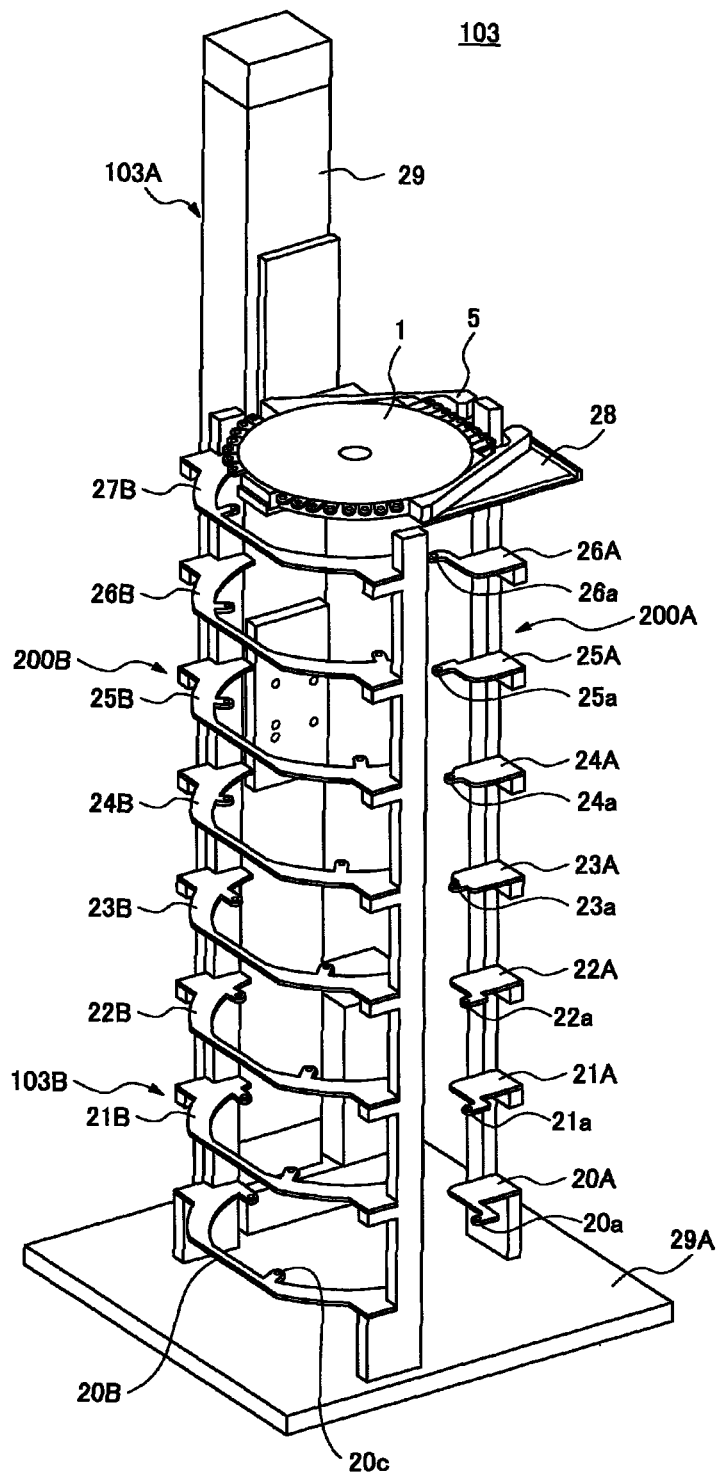
FIG. 14 is a perspective view showing a process in which the arranging mechanism arranges the tray which is on the optical disk case.
Figure 15:
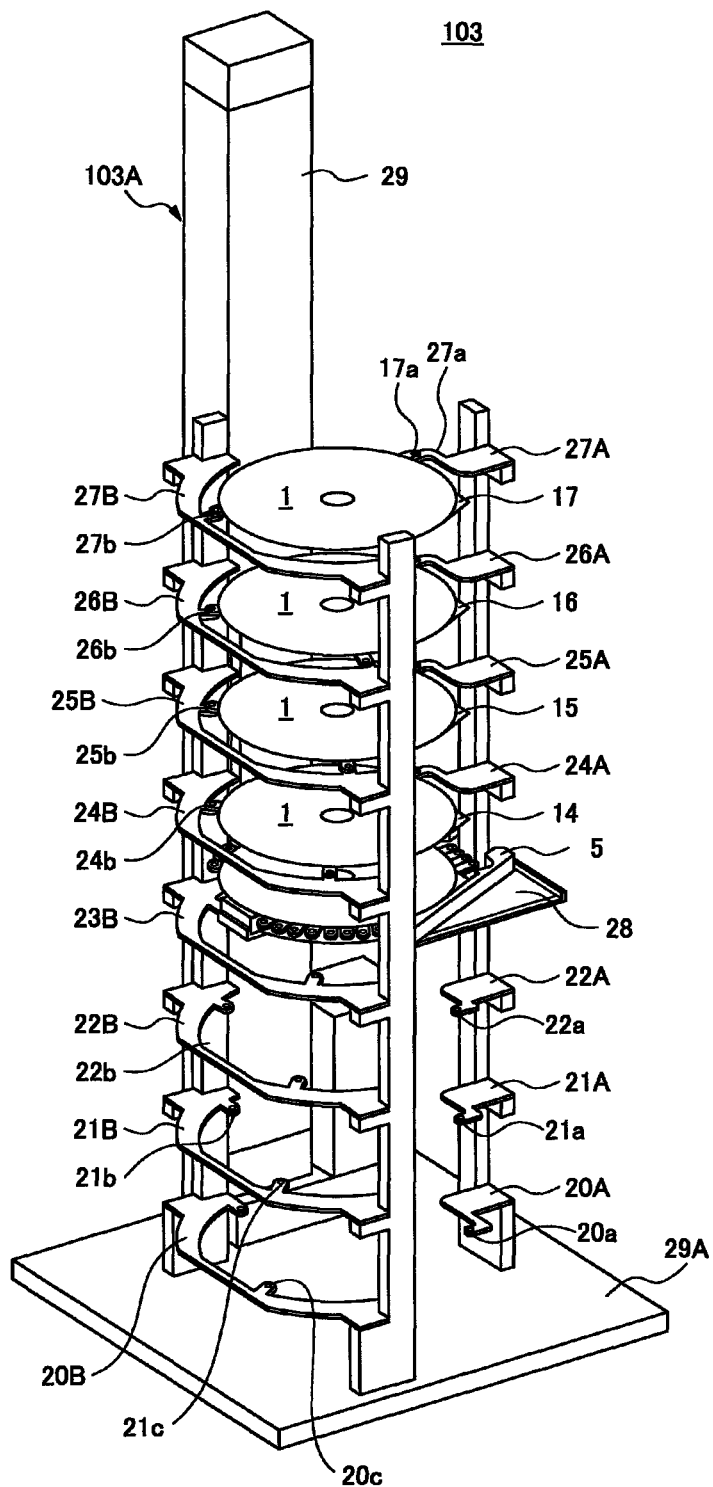
FIG. 15 is a perspective view showing a process in which the arranging mechanism arranges the tray which is on the optical disk case.
Figure 16:
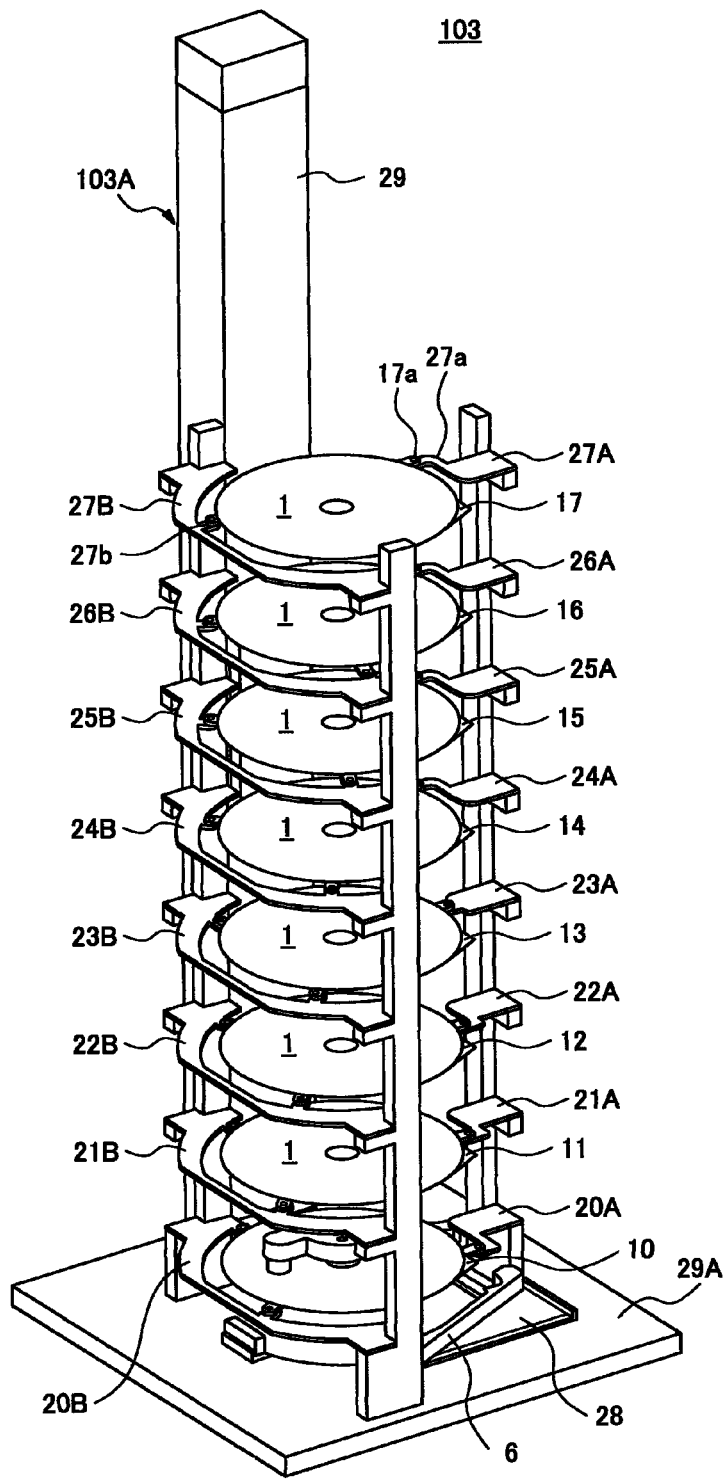
FIG. 16 is a perspective view showing a process in which the arranging mechanism arranges the tray which is on the optical disk case.

Next, a process, in which the transport mechanism 104 transports the optical disk 1 stocked in the optical disk case 5 to the optical disk drives 40 and 45, will be described by use of an exemplified case of the optical disk case 5 according to the second exemplary embodiment. FIG. 12 and FIG. 13 show the arranging mechanism 103 to arrange the first tray 10 to the eighth tray 17, which are piled on the optical disk case 5, in the direction of thickness of the trays with leaving space between the trays. The arranging mechanism 103 includes a lifting apparatus 103A which is loaded with the optical disk case 5 and transports the optical disk case 5 up and down, and a supporting body 103B which supports a plurality of trays 10 to 17, which are loaded on the optical disk case 5, one by one. The lifting apparatus 103A includes a base 29A, a linear guide 29 which extends upward from the base 29A, and a lifting table 28 which moves up and down along the linear guide 29. The lifting apparatus 103A makes the optical disk case 5 loaded on the lifting table 28, and makes the optical disk case 5 move up and down. Meanwhile, the supporting body 103B is positioned so as to surround the lifting table 28. The supporting body 103B includes three poles 201a, 201b and 201c which extend vertically in FIG. 12, and supporting boards 20B to 27B, and 20A to 27A which are piled in a direction of each axis of the poles 201a, 201b and 201c with leaving space between the supporting boards. A first component 200A includes the pole 201a, and a plurality of the supporting boards 20A to 27A which are attached to the pole 201a. Moreover, a second component 200B includes the pole 201b, the pole 201c, and a plurality of the supporting boards 20B to 27B which are arranged horizontally between the pole 201b and the pole 201c. The supporting boards 20A to 27A, which are arranged in the first component 200A, and the supporting boards 20B to 27B, which are arranged in the second component 200B, have the same height respectively. Moreover, the supporting boards 20A to 27A have projections 20a to 27a respectively which project upward inside an area where the lifting table 28 moves, and the supporting boards 20B to 27B have projections 20b to 27b, and 20c to 27c respectively which project upward inside the area where the lifting table 28 moves. Each of the supporting boards 20A to 27A, which are arranged in the first component 200A, has one projection. The projections are corresponding to the projections 20a to 27a respectively. As shown clearly in FIG. 13, the projections 20a to 27a are arranged so that positions of the projections 20a to 27a in the horizontal direction may shift gradually, and consequently positions of the projections 20a to 27a may not overlap each other on the vertical line. The projection 20a of the supporting board 20A, which is the lowest step, is at the rightmost position out of the projections 20a to 27a shown in FIG. 13, and the positions of the projections shift gradually to the left in a step ascending order. Then, the projection 27a of the supporting board 27A, which is the highest step, is at the leftmost position out of the projections 20a to 27a shown in FIG. 13. The positions of the projections 20a to 27a are corresponding to the positions of the tray handling parts 10a to 17a which project from the side edges 301 to 371 corresponding to the upper end edges of the trays 10 to 17 respectively. That is, the position of the projection 20a of the supporting board 20A, which is the lowest step, is corresponding to the position of the tray handling part 10a of the first tray 10 which is piled as the lowest layer. The position of the projection 21a of the supporting board 21A, which is the second step, is corresponding to the position of the tray handling part 11a of the tray 11 which is piled as the second layer from the bottom. Similarly, the projections 22a to 27a of the supporting boards 22A to 27A, which are arranged above the steps, are corresponding to the positions of the tray handling parts 12a to 17a of the tray 12 to 17 respectively. Meanwhile, each of the supporting boards 20B to 27B, which are arranged in the second component 200B, has two projections. The projections are corresponding to the projections 20b to 27b, and 20c to 27c respectively. As shown in FIG. 13, the projections 20b to 27b are arranged in left side areas of centerlines which are vertical to long sides of the supporting boards 20B to 27B respectively. Moreover, the projections 20c to 27c are arranged in right side areas of the centerlines which are vertical to the long sides of the supporting boards 20B to 27B respectively. The projection 20b of the supporting board 20B, which is the lowest step, out of the projections arranged in the left side area is located near to the pole 201b in FIG. 13. The position of the projection becomes far from the pole 201b toward the right side in FIG. 12 in a step ascending order. Then, the projection 27b of the supporting board 27B, which is the highest step, is located near to a center of the long side of the supporting board 27B. In contrast, the projection 20c of the supporting board 20C, which is the lowest step, out of the projections arranged in the right side area is located near to a center of a long side of the supporting board 20C. The position of the projection shifts gradually to the right side in a step ascending order. The projection 27c of the supporting board 27C, which is the highest step, is arranged near to the pole 201c. The positions of the projections 20b to 27b, and 20c to 27c are corresponding to the positions of the tray handling parts 10b to 17b, and 10c to 17c which project from the side edges 302 to 372 corresponding to the low end edges of the trays 10 to 17 respectively. That is, the positions of the projections 20b and 20c of the supporting boards 20B, which is the lowest step, are corresponding to the positions of the tray handling parts 10b and 10c of the first tray 10 which is piled as the lowest layer. Similarly, the positions of the projections 21b to 27b, and 21c to 27c of the supporting boards 21B to 27B, which are arranged above the supporting board 20B, are corresponding to the positions of the tray handling parts 11b to 17b, and 11c to 17c of the trays 11 to 17 respectively. The arranging mechanism 103 arranges a plurality of the trays 10 to 17, which are piled on the optical disk case 5, in the following way. First, the lifting table 28 of the lifting apparatus 103A ascends above the supporting body 103B. The lifting table 28, on which the optical disk case 5 is loaded, ascends. FIG. 14 is a perspective view showing a state that the optical disk case 5 is loaded on the lifting table 28 which moves to the upper part of the arranging mechanism 103. Next, the lifting table 28 descends. The positions of the projections 20a to 27a, 20b to 27b, and 20c to 27c of the supporting boards of the steps are corresponding to the positions of the tray handling parts 10a to 17a, 10b to 17b, and 10c to 17c of the piled trays respectively. Accordingly, when the lifting table 28 descends, three projections of the supporting board of each step are fitted into three holes of the tray handling parts of each corresponding tray in turn, and each supporting board supports each tray. FIG. 15 is a perspective view showing a state that the supporting boards of the highest step to the fourth step from the top support the trays while the lifting table is descending. As shown in FIG. 15, a total of three projections 27a, 27b and 27c, which are arranged on the supporting boards 27A and 27B corresponding to the highest step, support the tray handling parts 17a, 17b and 17c of the eighth tray 17 which is piled as the highest layer out of the trays 10 to 17 piled on the optical disk case 5. Next, the projections 26a to 24a, 26b to 24b and 26c to 24c arranged on the support boards 26A to 24A, and 26B to 24B which are arranged below the supporting boards 27A and 27B support sequentially the tray handling parts of the trays 16 to 14 which are corresponding to the supporting boards 26A to 24A, and 26B to 24B respectively. At an end of the arranging process, the optical disk case 5 on the lifting table 28 descends to the lowest point of the lifting apparatus 103A as shown in FIG. 16. Similarly to the case of the trays 17 to 14, the tray handling parts of the trays 13 to 10 are supported at the positions of the projections of the arranging mechanism 103 respectively. A picker 30, which is included in the transporting mechanism 104, takes out the optical disk 1 from the trays 10 to 17 which are supported by the supporting boards 20A to 27A, and 20B to 27B of the arranging mechanism 103, and transports the optical disk 1 to the first group of the optical disk drives 105 and the second group of the optical disk drives 106.

Figure 17:
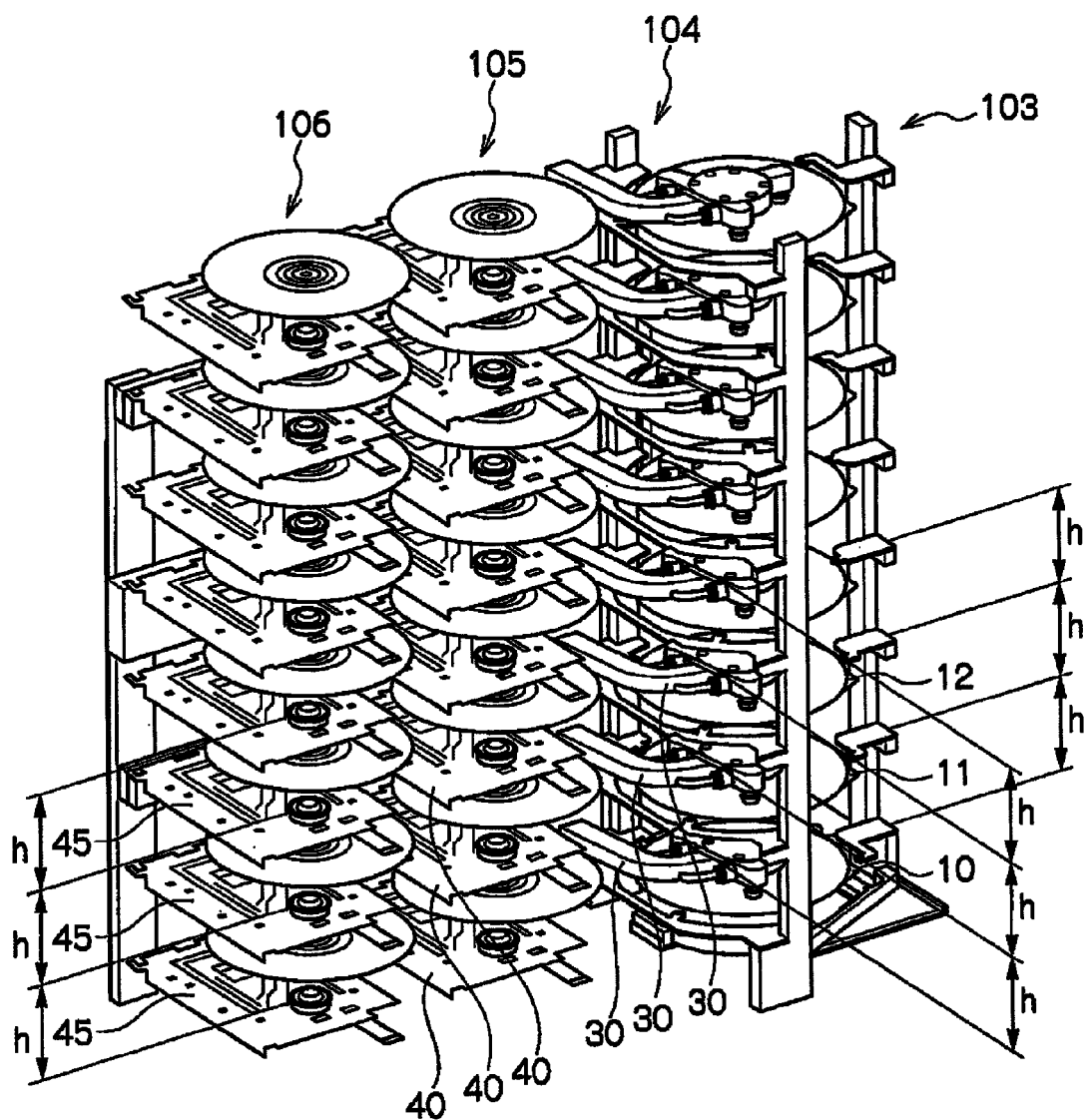
FIG. 17 is a perspective view of the arranging mechanism, an optical disk transporting mechanism and a group of the optical disk drives which are included in the optical disk recording and regenerating apparatus.

FIG. 17 is a perspective view showing the transport mechanism 104 which includes the pickers 30, and the first group of the optical disk drives 105 and the second group of the optical disk drives 106 which regenerate information stored in the optical disk. The transport mechanism 104 includes eight pickers 30 in the vertical direction with leaving fixed space between the pickers 30. A distance between the pickers 30, which are vertically adjacent each other, is a height h which is corresponding to a distance between the supporting boards of the arranging mechanism 103. Similarly, the first group of the optical disk drives 105 and the second group of the optical disk drives 106 include eight optical disk drives 40 and eight optical disk drives 45 respectively each of which is far from the adjacent optical disk drive by the height h. Therefore, it is possible that the arranging mechanism transports a plurality of optical disks 1 or the partition sheet 2 simultaneously from the trays 10 to 17 to the optical disk drive 40 or the optical disk drive 45, through moving a plurality of the pickers 30. However, the distance between the supporting boards of the arranging mechanism 103, the distance between the pickers, the distance between the optical disk drives 40, and the distance between the optical disk drives 45 in the optical disk recording and regenerating apparatus D are not limited to the settings described here. For example, it may be preferable to use the following settings. The distance between the first tray 10 and the second tray 11, the distance between the pickers 30 whose positions are corresponding to the positions of the trays 10 and 11 respectively, the distance between the optical disk drives 40 whose positions are corresponding to the positions of the trays 10 and 11, and the distance between the optical disk drives 45 whose positions are corresponding to the positions of the trays 10 and 11 are set to h1 respectively. Moreover, the distance between the second tray 11 and the third tray 12, the distance between the pickers 30 which are arranged at the positions corresponding to the positions of the trays, the distance between the optical disk drives 40, and the distance between the optical disks 45 are set to h2 respectively. Similarly, the distance between the trays, the distance between the pickers and the distance between the optical disk drives in the layers above the third tray are set to h3, . . . respectively. As mentioned above, a condition required for the optical disk recording and regenerating apparatus D is that the distance between the trays adjacent each other, the distance between the pickers whose positions are corresponding to the positions of the adjacent trays, and the distance between the optical disk drives whose positions are corresponding to the positions of the adjacent trays are identical each other. It is possible that the optical disk recording and regenerating apparatus D has structure that the distance between the trays adjacent each other is different per the tray and the distance between the pickers adjacent each other is different per the picker, and the distance between the optical disk drives adjacent each other is different per the optical disk drive only if the condition is satisfied.

Figure 18:
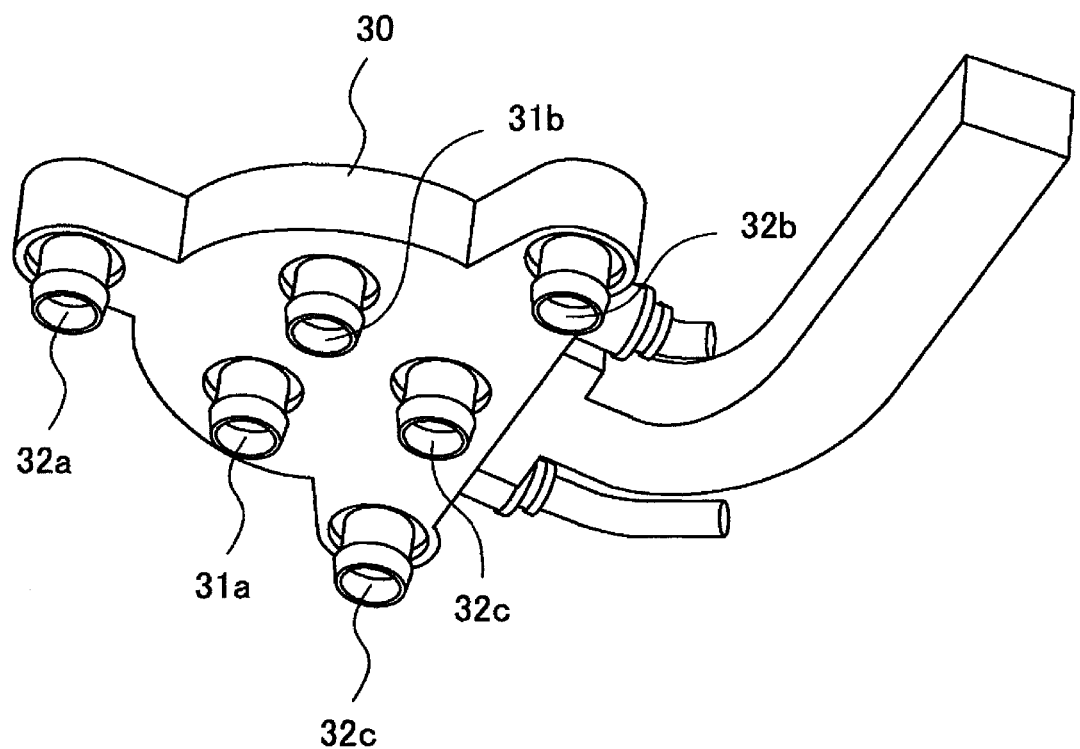
FIG. 18 is a perspective view showing another example of the picker which is included in the optical disk recording and regenerating apparatus according to the present invention.

FIG. 18 shows a detailed view of the picker 30. The picker 30 includes a set of three optical disk sucking pads 31a, 31b and 31c which suck the upper surface side of the optical disk 1 in the optical disk exposing area which is located outside the hole of the optical disk 1 whose inner diameter is φ d1, and inside the hole of the partition sheet 2 whose inner diameter is φ d2. Furthermore, the picker 30 includes a set of three partition sheet sucking pads 32a, 32b and 32c which are arranged outside the optical disk sucking pads 31a, 31b and 31c and which suck the upper surface side of the partition sheet 2. Each of three optical disk sucking pads 31a, 31b and 31c is a sucker type member made of rubber or the like. The optical disk sucking pads 31a, 31b and 31c are combined into one system by the manifold, and are connected to a vacuum pump, which is not shown in the figure, via a pressure-resistant tube or the like. In virtue of the structure, a control process to make a vacuum is carried out for the inside of the picker 30 by use of all of three sucking pads through the on and off operation of the vacuum pump, the open and close operation of the electromagnetic valve or the like. The control process to make a vacuum is carried out for the picker 30, and consequently the picker 30 sucks and releases each optical disk 1. Similarly, each of the partition sheet sucking pads 32a, 32b and 32c is a sucker type member made of rubber or the like. The partition sheet sucking pads 32a, 32b and 32c are combined into one system by the manifold, and are connected to a vacuum pump, which is not shown in the figure, via a pressure-resistant tube or the like. The control process to make a vacuum is carried out for the inside of the picker 30 by the on and off operation of the vacuum pump or the open and close operation of the electromagnetic valve, and consequently the picker 30 carries out the work of sucking and releasing each partition sheet 2. A control system for the optical disc sucking pads 31a, 31b and 31c and a control system for the partition sheet sucking pads 32a, 32b and 32c are independent mutually. Both of the control systems may work separately, and may work simultaneously. In the case that both the control systems carry out the sucking control simultaneously for the optical disc sucking pads 31a, 31b and 31c, and the partition sheet sucking pads 32a, 32b and 32c respectively, it is possible that the picker 30 makes the optical disk sucking pads 31a, 31b and 31c and the partition sheet sucking pads 32a, 32b and 32c suck the optical disk 1 and the partition sheet 2 respectively and transports the optical disk 1 and the partition sheet 2 simultaneously. Here, a mechanism that the picker 30 according to the second exemplary embodiment holds the partition sheet 2 is not limited to using sucking force of the vacuum pump similarly to the case of the first exemplary embodiment. It may be preferable to adopt a system to hold the partition sheet 2 by use of an electromagnet. For example, it may be preferable that magnetic material is stuck on a surface of the partition sheet 2, and the picker has an electromagnet instead of the partition sheet sucking pad according to the above-mentioned exemplary embodiment. According to the structure, in the case that the electromagnetic of the picker is ON, the electromagnetic holds the partition sheet. On the other hand, in the case that the electromagnet is OFF, the picker releases the partition sheet.

Figure 19:
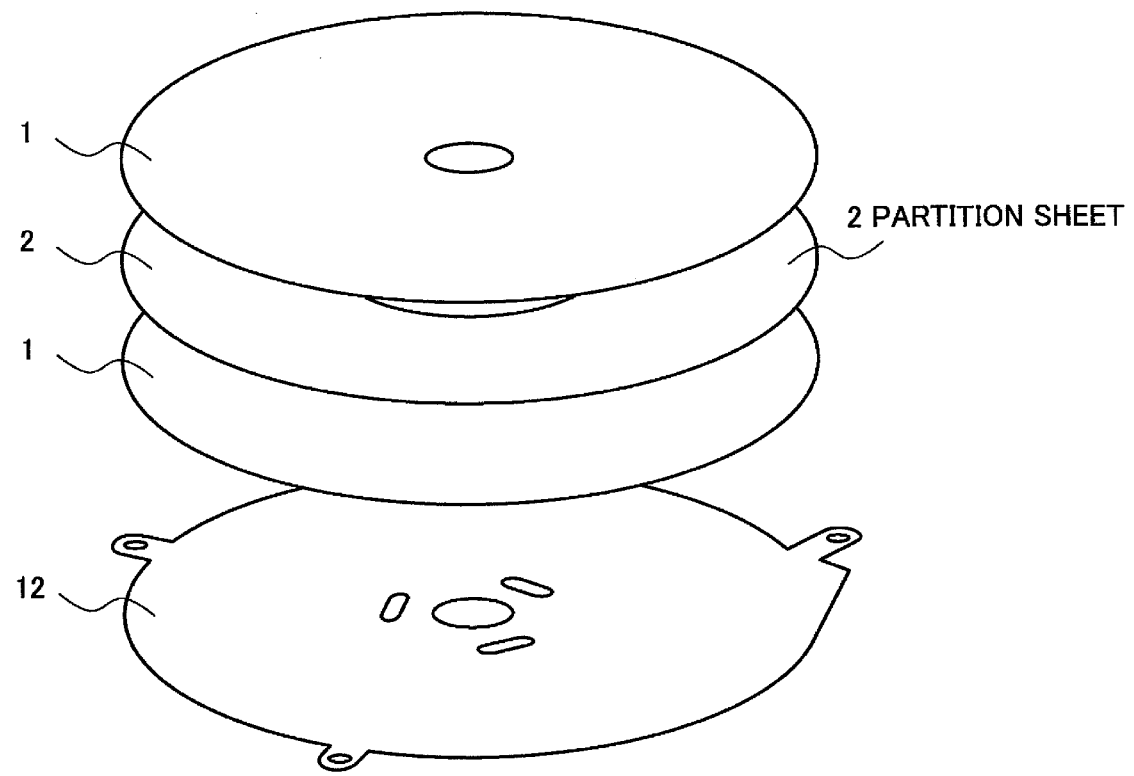
FIG. 19 is a perspective view showing a state that the tray, the optical disk and the partition sheet, which are piled, are arranged in a direction of thickness with leaving space.
Figure 20:
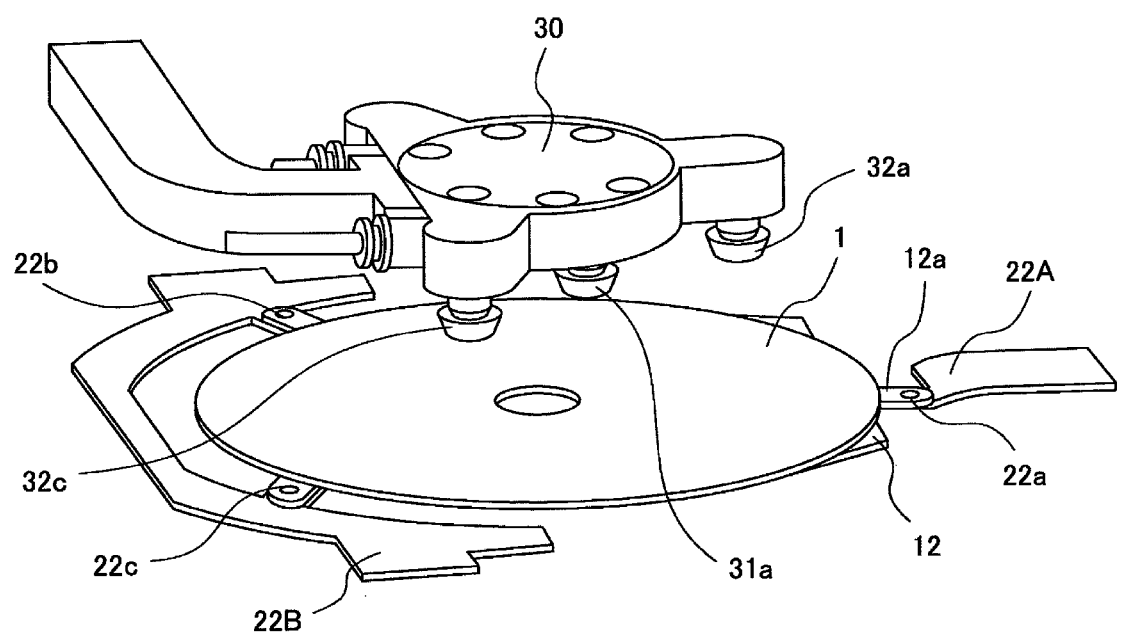
FIG. 20 is a perspective view showing a state that the picker is positioned above the tray which is supported by a supporting board.
Figure 21:
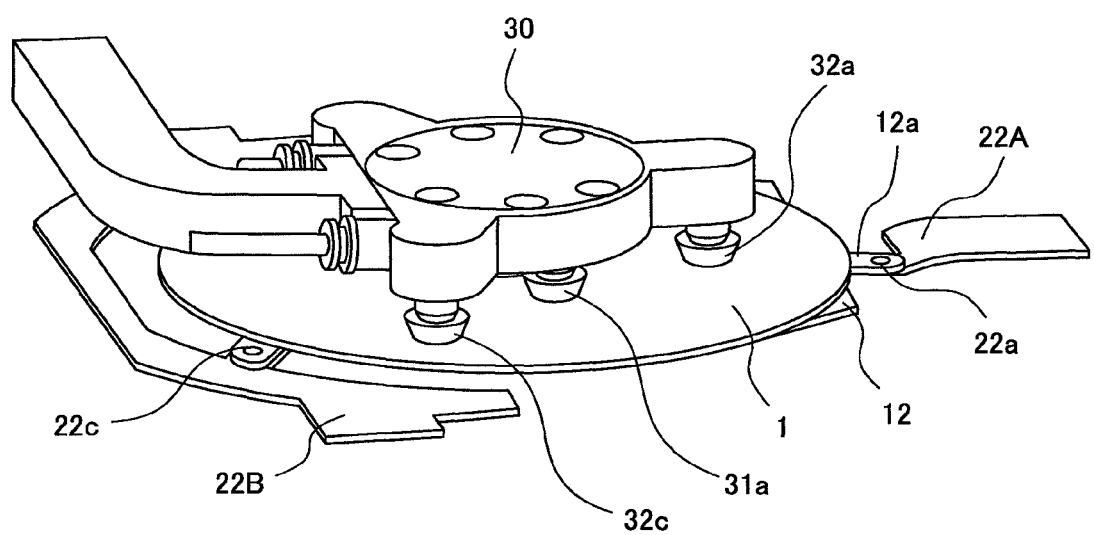
FIG. 21 is a perspective view showing a process in which the picker sucks the optical disk.

Next, a basic operation in which the picker 30 transports the optical disk 1 to the optical disk drives 40 and 45 will be described with reference to FIGS. 19 to 21. A case of the optical disk 1 and the partition sheet 2, which are piled on the third tray 12, is exemplified. As shown in FIG. 19, the optical disk 1, the partition sheet 2 and the optical disk 1 are piled in this order on the third tray 12. The picker 30 moves to a place above the third tray 12 and above an almost central part of the optical disk 1 as shown in FIG. 20. Next, as shown in FIG. 21, the picker 30 descends until the optical disk sucking pads 31a, 31b and 31c touch the optical disk 1 on the third tray 12 by an actuator, which is not shown in the figure, of the transporting mechanism. Afterward, the optical disk sucking pads 31a, 31b and 31c can suck the optical disk through working the vacuum pump, or handling the electromagnetic valve or the like which is not shown in the figure.

Figure 22:
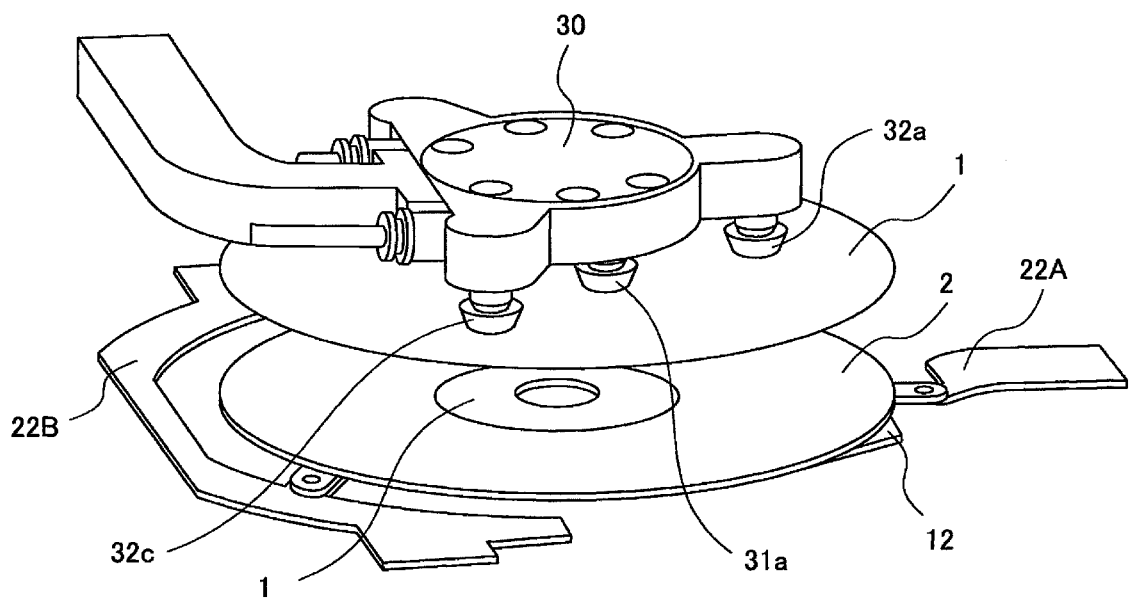
FIG. 22 is a perspective view showing a state that the picker sucks and holds the optical disk.

In the sucking process, each of the optical disk sucking pads 31a, 31b and 31c sucks the outer circumferential side, which is located outside the central hole of the upper optical disk 1, of the upper optical disk 1. As shown in FIG. 22, the picker 30 ascends after sucking the optical disk 1. The picker 30 transports only the optical disk 1. At this time, the underside optical disk 1 and the partition sheet 2 which are piled each other, are left on the third tray 12.

Figure 23:
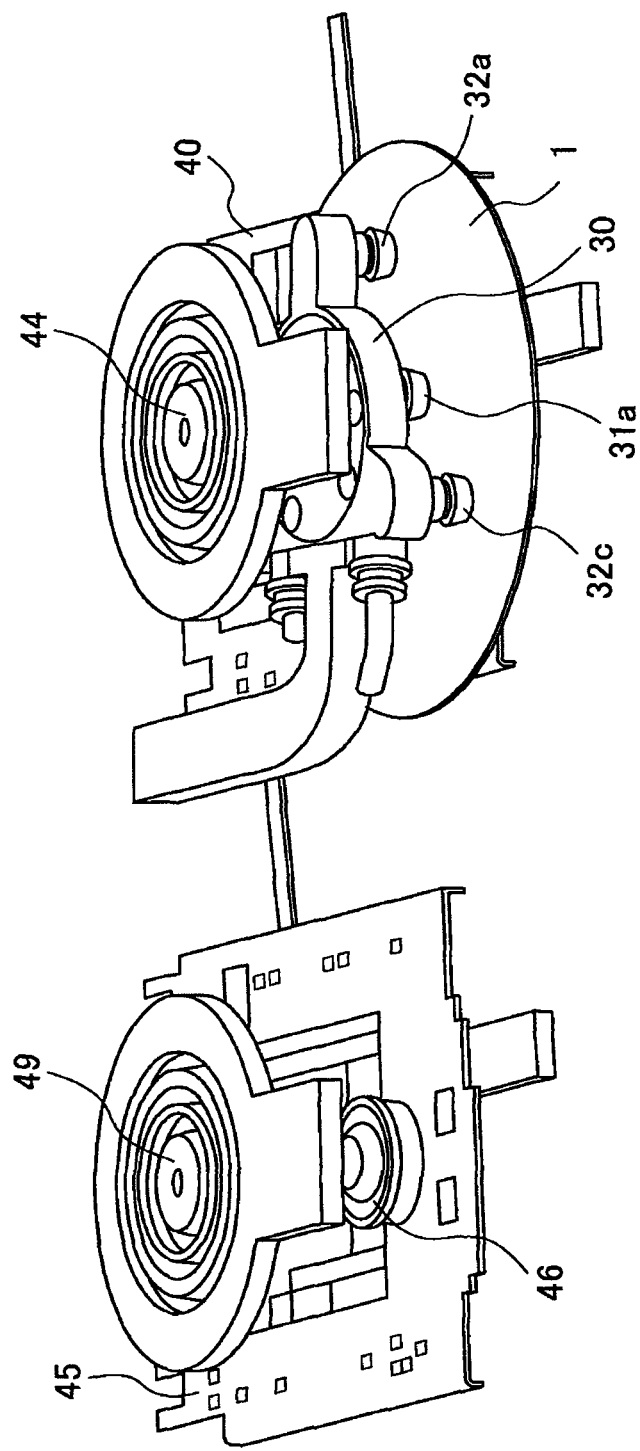
FIG. 23 is a perspective view showing a process in which the optical disk is set to a first optical disk drive.

FIG. 23 shows a state that the picker 30, which hold the optical disk 1, moves to the optical disk drive 40 which records information in the optical disk 1 and regenerates the information from the optical disk 1. The optical disk recording and regenerating apparatus D includes the first group of the optical disk drives 105 whose number is equal to the number of the optical disks 1 piled on each of the trays 10 to 17, and the second group of the optical disk drives 106 whose number is also equal to the number of the optical disks 1. The first group of the optical disk drives 105 and the second group of the optical disk drive 106 include the first optical disk drive 40 and the second disk drives 45 respectively which are arranged vertically. The optical disk drives 40 and 45 include spindle motors 41 and 46 respectively for rotating the optical disk 1. Moreover, the optical disk drives 40 and 45 include clampers 44 and 49 for fixing the optical disk 1 on the spindle motors 41 and 46 respectively. First, the picker 30, which holds the optical disk 1, transports the optical disk 1 to the optical disk drive 40. When the picker 30 transports the optical disk 1 to a position of the spindle motor 41 on the first optical disk drive 40, each air of the optical disk sucking pads 31a, 31b and 31c is released by a work of an electromagnetic valve which is not shown in the figure. Then, the picker 30 makes the optical disk 1 released from the optical disk sucking pads 31a, 31b and 31c. The optical disk 1 is arranged on a turntable of the spindle motor 41 of the first optical disk drive 40.

Figure 24:
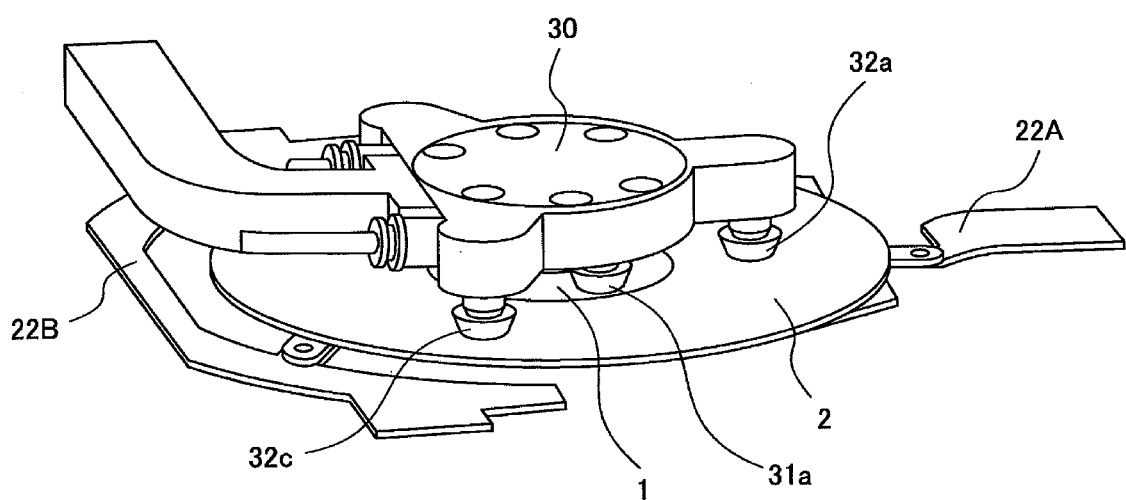
FIG. 24 is a perspective view showing a process in which both of the partition sheet and the optical disk are sucked.
Figure 25:
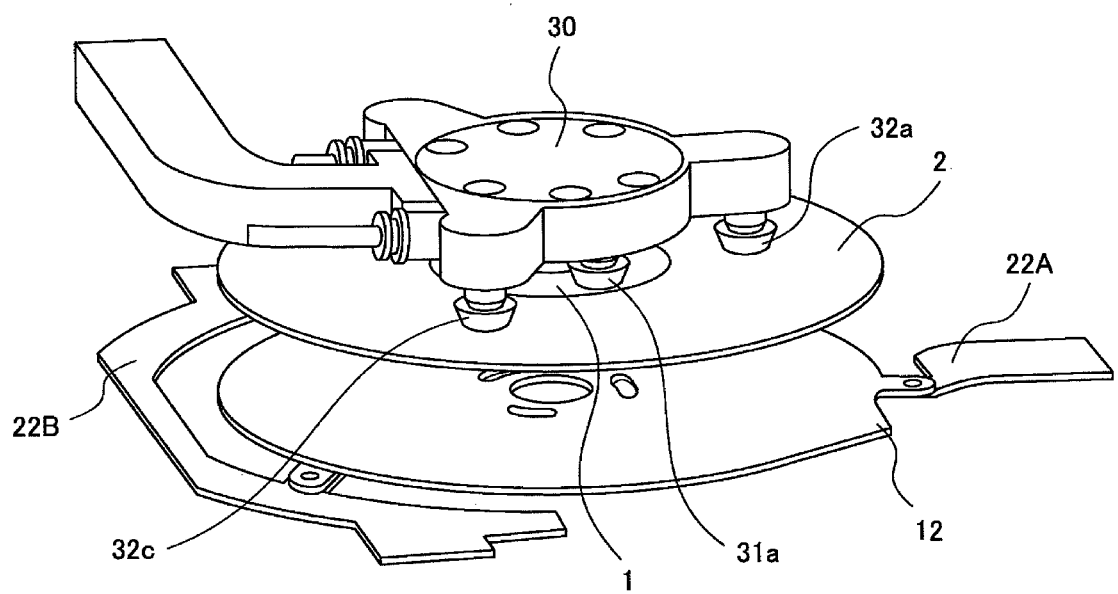
FIG. 25 is a perspective view showing a state that both of the partition sheet and the optical disk are sucked and held.

FIG. 24 is a perspective view of the picker 30 which returns to the place above the third tray 12. The picker 30 sucks the partition sheet 2 by use of the partition sheet sucking pads 32a, 32b and 32c which are located outside the hole of the partition sheet 2 whose inner diameter is φ d2. Simultaneously, through working the optical disk sucking pads 31a, 31b and 31c, the picker 30 sucks a position on the optical disk 1 piled under the partition sheet 2, and which is located on the outside of the central hole of the optical disk 1 piled under the partition sheet 2. As a result, the picker 30 holds both of the partition sheet 2 and the optical disk 1 simultaneously. Afterward, the picker 30 rises to the place above the third tray 12. At this time, there is nothing left on the third tray 12. Afterward, the picker 30, which holds the partition sheet 2 and the optical disk 1, moves to a place above on the second optical disk drive 45 as shown in FIG. 26. The picker 30, which moves to the place above the second optical disk drive 45, makes only air of the optical disk sucking pads 31a, 31b and 31c released while making air of the partition sheet sucking pads 32a, 32b and 32c work as it is. As a result, the picker 30 puts only the optical disk 1 on the second optical disk drive 45 while holding the partition sheet 2. As shown in FIG. 27, the picker 30, which puts only the optical disk 1 on the second optical disk drive 45, leaves from the optical disk drives 40 and 45 while holding the partition sheet 2. Meanwhile, the optical disk drives 40 and 45 make the clampers 44 and 49 stick to the optical disks 1 which are arranged on the turntables of the spindle motors 41 and 46 to fix the optical disks 1 on the spindle motors 41 and 46 respectively.

The transport of the optical disk 1 from the optical disk case 5 to the optical disk drives 40 and the optical disk drive 45 is completed through carrying out the above mentioned processes. Afterward, the optical disk drives 40 and 45 record and regenerate information.

According to the above mentioned embodiment, it is possible to realize the optical disk case which can be piled with the optical disks, and stock the optical disks compactly without making the optical disk have specific structure. According to the present invention, it is possible to make the capacity of the storage medium enlarged. Moreover, according to the present invention, it is possible to realize the optical disk case which has the excellent random access property, and it is possible to transport the optical disk to the optical disk drive at a high speed.

While the present invention has been particularly shown and described with reference to the exemplary embodiment thereof, the present invention is not limited to these exemplary embodiments. Various changes, which a person skilled in the art can understand in the scope of the present invention, can be carried out in the composition of the present invention and details.

While the present invention is described through exemplifying the optical disk recording and regenerating apparatus in the exemplary embodiment, the present invention is not always applied to only the optical disk recording and regenerating apparatus. The present invention can be applied to the general optical disk apparatus which includes an optical disk apparatus having only recording function and an optical disk apparatus having only regenerating function.

This application is based upon and claims the benefit of priority from Japanese Patent Application 2009-169951, filed on Jul. 21, 2009, the disclosure of which is incorporated herein in its entirety by reference.

DESCRIPTION OF THE CODES

1 Optical disk
2 Partition sheet
5 Optical disk case
6 Case
10 First tray
11 Second tray
12 Third tray
13 Fourth tray
14 Fifth tray
15 Sixth tray
16 Seventh tray 17 Eighth tray
10a to 17a Tray handling part
10b to 17b Tray handling part
10c to 17c Tray handling part
20A to 27A Support
20B to 27B Supporting board
20a to 27a Projection
20b to 27b Projection
20c to 27c Projection
30 Picker
31a to 31c Optical disk sucking pad
32a to 32c Partition sheet sucking pad
40 First optical disk drive
45 Second optical disk drive
51 Optical disk
52 Partition sheet
52a Held area
55 Optical disk case
56 Case
60 First tray
61 Second tray
62 Third tray
63 Fourth tray
64 Fifth tray
65 Sixth tray
66 Seventh tray
67 Eighth tray
61a to 67a Tray handling part
61b to 67b Tray handling part
61c to 67c Tray handling part
71A to 77A Supporting board
71B to 77B Supporting board
80 Picker
81a to 81c Optical disk sucking pad
82a to 82c Partition sheet sucking pad
101 Rotary stocker
102 Cartridge picker
103 Arranging mechanism
103A Lifting apparatus
103B Supporting body
104 Transporting mechanism
105 First group of optical disk drives
106 Second group of optical disk drives
D Optical disk recording and regenerating apparatus
301 to 372 Side edge
601 to 672 Side edge

The invention claimed is:

1. An optical disk apparatus, comprising:
a tray to be loaded with a plurality of optical disks each of which is piled through a partition sheet having a held area projecting from an edge of the optical disk and not overlapping with the optical disk in the case that the optical disk and the partition sheet are piled; and
an optical disk sucking unit to suck an upper surface of the optical disk which is loaded on the tray,
a partition sheet sucking unit to suck the partition sheet through sucking the held area and
a holding unit which sucks and holds, at least, one of the optical disk and the partition sheet, wherein the holding unit moves to an optical disk drive.

2. An optical disk apparatus, comprising:
a tray to be loaded with a plurality of optical disks each of which is piled through a partition sheet having an optical disk exposing area not overlapping with the optical disk in the case that the optical disk and the partition sheet are piled; and
a holding unit which includes an optical disk sucking unit to suck an upper surface of the optical disk, which is loaded on the tray, in the optical disk exposing area and a partition sheet sucking unit to suck an upper surface of the partition sheet, and which sucks and holds, at least, one of the optical disk and the partition sheet, wherein the holding unit moves to an optical disk drive.

3. The optical disk apparatus according to claim 1, wherein a plurality of the trays,
a plurality of the optical disk drives and a plurality of the holding unit are piled respectively, and wherein the optical disk apparatus includes an arranging unit which leaves space between the piled trays in a direction of thickness of the piled trays and which arranges the trays so that the holding unit corresponding to the tray can hold each optical disk or each partition sheet.

4. The optical disk apparatus according to claim 2, wherein a plurality of the trays, a plurality of the optical disk drives and a plurality of the holding unit are piled respectively, and wherein the optical disk apparatus includes an arranging unit which leaves space between the piled trays in a direction of thickness of the piled trays and which arranges the trays so that the holding unit corresponding to the tray can hold each optical disk or each partition sheet.

5. The optical disk apparatus according to claim 3, wherein the arranging unit, comprising:
a lifting unit to make an optical disk case, which is loaded with the piled trays, ascend and descend; and
a supporting body to support each tray in a state that each tray is separated one by one out of the piled trays, and each tray is arranged.

6. The optical disk apparatus according to claim 4, wherein the arranging unit, comprising:
a lifting unit to make an optical disk case, which is loaded with the piled trays, ascend and descend; and
a supporting body to support each tray in a state that each tray is separated one by one out of the piled trays, and each tray is arranged.

7. The optical disk apparatus according to claim 5, wherein the tray includes a tray handling part, which supports the tray, on a circumferential edge of the tray and at a position where the tray handling part does not overlap with a tray handling part of another tray, the disk case supports the tray so that the tray handling part may be located outside a circumferential edge of the disk case, the supporting body includes a plurality of supporting boards which support the trays one by one with leaving space between the trays in an ascending and descending direction of the optical disk case, and each of the plural supporting boards includes a supporting part, which supports the tray handling part, at a position corresponding to a position of the tray handling part of the tray which the supporting board supports.

8. The optical disk apparatus according to claim 5,
wherein the tray includes a tray handling part, which supports the tray, on a circumferential edge of the tray and at a position where the tray handling part does not overlap with a tray handling part of another tray, the disk case supports the tray so that the tray handling part may be located outside a circumferential edge of the disk case, the supporting body includes a plurality of supporting boards which support the trays one by one with leaving space between the trays in an ascending and descending direction of the optical disk case, and each of the plural supporting boards includes a supporting part, which supports the tray handling part, at a position corresponding to a position of the tray handling part of the tray which the supporting board supports.

9. The optical disk apparatus according to claim 3,
wherein a distance between the trays adjacent each other, a distance between the holding unit corresponding to the trays adjacent each other and a distance between the optical disk drives corresponding to the trays adjacent each other are equal each other.

10. The optical disk apparatus according to claim 4,
wherein a distance between the trays adjacent each other, a distance between the holding unit corresponding to the trays adjacent each other and a distance between the optical disk drives corresponding to the trays adjacent each other are equal each other.

11. The optical disk apparatus according to claim 3,
wherein number of the optical disk drives and number of the optical disks, which are piled on each tray, are equal each other.

12. The optical disk apparatus according to claim 4,
wherein number of the optical disk drives and number of the optical disks, which are piled on each tray, are equal each other.

13. The optical disk apparatus according to claim 11,
wherein a distance between two trays adjacent each other out of a plurality of the trays, a distance between the holding unit corresponding to the two trays, and a distance between the optical disk drives corresponding to the two trays are equal each other.

14. The optical disk apparatus according to claim 12,
wherein a distance between two trays adjacent each other out of a plurality of the trays, a distance between the holding unit corresponding to the two trays, and a distance between the optical disk drives corresponding to the two trays are equal each other.

15. An optical disk arranging apparatus, comprising:
a lifting unit to lift an optical disk case piled and loaded with a plurality of trays each of which is loaded with an optical disk and includes a tray handling part at a position where the tray handling part does not overlap with another tray handling part; and
a supporting unit including a plurality of supporting boards, each of which includes a supporting part corresponding to the tray handling part, and supporting the layered trays, wherein through the lifting unit's making the optical disk case descend along the supporting unit and the supporting part's catching the tray handling part, the trays are arranged one by one on the supporting boards.

* * * * *

UNITED STATES PATENT AND TRADEMARK OFFICE
CERTIFICATE OF CORRECTION

| | | |
|---|---|---|
| PATENT NO. | : 8,539,517 B2 | Page 1 of 1 |
| APPLICATION NO. | : 13/384985 | |
| DATED | : September 17, 2013 | |
| INVENTOR(S) | : Hisaya Niizawa, Masashi Kubota and Kenji Tagami | |

It is certified that error appears in the above-identified patent and that said Letters Patent is hereby corrected as shown below:

In the Drawings

Drawing Sheet 12 of 27, Fig. 12: Delete "26A" and insert -- 27A --

Drawing Sheet 12 of 27, Fig. 12: Delete "26a" and insert -- 27a --

In the Specification

Column 6, Line 6: Delete "be," and insert -- be --

Column 9, Line 27: Delete "overlap:" and insert -- overlap --

Column 11, Line 42: Delete "A11" and insert -- A17 --

Column 12, Line 21: Delete "y D" and insert -- Φ D --

In the Claims

Column 20, Line 53: In Claim 8, delete "5," and insert -- 6, --

Signed and Sealed this
Eleventh Day of November, 2014

Michelle K. Lee
*Deputy Director of the United States Patent and Trademark Office*